US007780529B2

(12) United States Patent  (10) Patent No.: US 7,780,529 B2
Rowe et al.  (45) Date of Patent: Aug. 24, 2010

(54) SYSTEM, METHOD AND INTERFACE FOR MONITORING PLAYER GAME PLAY IN REAL TIME

(75) Inventors: Rick Rowe, Reno, NV (US); Daryn Kiely, Henderson, NV (US); Derrick Price, Las Vegas, NV (US); Laura Hunt, Las Vegas, NV (US); Larry Lewis, Las Vegas, NV (US); Timothy Moser, Las Vegas, NV (US)

(73) Assignee: IGT, Reno, NV (US)

( * ) Notice: Subject to any disclaimer, the term of this patent is extended or adjusted under 35 U.S.C. 154(b) by 353 days.

(21) Appl. No.: 10/116,680

(22) Filed: Apr. 4, 2002

(65) Prior Publication Data

US 2002/0187834 A1  Dec. 12, 2002

Related U.S. Application Data

(60) Provisional application No. 60/281,875, filed on Apr. 4, 2001.

(51) Int. Cl.
   *A63F 9/24*      (2006.01)
   *A63F 13/00*     (2006.01)
   *G06F 17/00*     (2006.01)
   *G06F 19/00*     (2006.01)

(52) U.S. Cl. .............................. 463/42; 463/16; 463/25; 463/40; 705/10; 273/138.1; 273/139

(58) Field of Classification Search ............. 463/40–43, 463/25–28
See application file for complete search history.

(56) References Cited

U.S. PATENT DOCUMENTS 4,283,709 A    8/1981  Lucero et al.
4,531,187 A    7/1985  Uhland (Continued)

FOREIGN PATENT DOCUMENTS

CA        2270062        10/1999

(Continued)

OTHER PUBLICATIONS

IGWB, Sep. 1996.*

(Continued)

*Primary Examiner*—John M. Hotaling, II
*Assistant Examiner*—Paul A. D'Agostino
(74) *Attorney, Agent, or Firm*—Weaver Austin Villeneuve & Sampson LLP

(57) ABSTRACT

A system for monitoring game play is disclosed. The system includes at least one gaming device adapted to present a game to a player and generate game play data. A communication link is provided between the gaming device and a host over which game play data, including player information, is transmitted. The host is adapted to store, manipulate, display and otherwise use the data. In one embodiment, the host is arranged to generate an interface for display by a display device. Game play information is displayed with the interface. In one embodiment, game play information regarding one or more gaming machines is displayed real-time by the interface. Filters may be used upon and reports generated using the game play information. In one embodiment, the system includes one or more portable, hand-held devices for displaying the interface and information.

51 Claims, 10 Drawing Sheets

U.S. PATENT DOCUMENTS

| | | | |
|---|---|---|---|
| 4,845,650 A | | 7/1989 | Meade et al. |
| 5,013,038 A | * | 5/1991 | Luxenberg et al. ............ 463/42 |
| 5,114,155 A | | 5/1992 | Tillery et al. |
| 5,259,613 A | * | 11/1993 | Marnell, II .................... 463/42 |
| 5,586,936 A | * | 12/1996 | Bennett et al. ................ 463/25 |
| 5,611,730 A | * | 3/1997 | Weiss ........................... 463/20 |
| 5,655,961 A | | 8/1997 | Acres et al. |
| 5,692,199 A | * | 11/1997 | Kikinis et al. ............... 710/260 |
| 5,702,303 A | | 12/1997 | Takemoto et al. |
| 5,702,304 A | | 12/1997 | Acres et al. |
| 5,738,583 A | | 4/1998 | Comas et al. |
| 5,741,183 A | | 4/1998 | Acres et al. |
| 5,761,647 A | | 6/1998 | Boushy ........................ 705/10 |
| 5,766,075 A | | 6/1998 | Cook et al. |
| 5,851,149 A | * | 12/1998 | Xidos et al. ................... 463/42 |
| 5,933,812 A | | 8/1999 | Meyer et al. |
| 6,003,013 A | * | 12/1999 | Boushy et al. ................ 705/10 |
| 6,048,269 A | | 4/2000 | Burns et al. .................. 463/25 |
| 6,056,289 A | | 5/2000 | Clapper |
| 6,142,876 A | | 11/2000 | Cumbers |
| 6,183,362 B1 | * | 2/2001 | Boushy ........................ 463/25 |
| 6,234,900 B1 | | 5/2001 | Cumbers |
| 6,254,483 B1 | | 7/2001 | Acres |
| 6,270,410 B1 | | 8/2001 | Demar et al. |
| 6,280,325 B1 | * | 8/2001 | Fisk ............................. 463/19 |
| 6,302,793 B1 | | 10/2001 | Fertitta, III et al. |
| 6,319,125 B1 | | 11/2001 | Acres |
| 6,340,331 B1 | * | 1/2002 | Saunders et al. .............. 463/25 |
| 6,375,567 B1 | | 4/2002 | Acres |
| 6,511,377 B1 | * | 1/2003 | Weiss ........................... 463/25 |
| 6,577,733 B1 | | 6/2003 | Charrin |
| 6,592,044 B1 | * | 7/2003 | Wong et al. ................. 235/493 |
| 6,628,939 B2 | * | 9/2003 | Paulsen ........................ 463/16 |
| 6,676,522 B2 | | 1/2004 | Rowe et al. |
| 6,682,421 B1 | * | 1/2004 | Rowe et al. ................... 463/25 |
| 6,712,695 B2 | * | 3/2004 | Mothwurf et al. ............. 463/25 |
| 6,758,393 B1 | | 7/2004 | Luciano et al. |
| 6,773,347 B1 | * | 8/2004 | Marshall et al. ............... 463/25 |
| 6,848,995 B1 | * | 2/2005 | Walker et al. .................. 463/25 |
| RE38,812 E | * | 10/2005 | Acres et al. ................... 463/26 |
| 2001/0019966 A1 | * | 9/2001 | Idaka .......................... 463/40 |
| 2001/0041610 A1 | | 11/2001 | Luciano et al. |
| 2001/0044337 A1 | | 11/2001 | Rowe et al. |
| 2002/0029207 A1 | | 3/2002 | Bakalash et al. |
| 2002/0058550 A1 | | 5/2002 | Pace et al. |
| 2002/0082076 A1 | * | 6/2002 | Roser et al. ................... 463/25 |
| 2002/0123376 A1 | * | 9/2002 | Walker et al. ................. 463/11 |
| 2002/0132664 A1 | * | 9/2002 | Miller et al. .................. 463/29 |
| 2002/0155887 A1 | | 10/2002 | Criss-Puszkiewicz et al. |
| 2002/0177480 A1 | | 11/2002 | Rowe |
| 2002/0198052 A1 | * | 12/2002 | Soltys et al. .................. 463/42 |
| 2003/0027631 A1 | | 2/2003 | Hedrick et al. |
| 2003/0045354 A1 | | 3/2003 | Giobbi |
| 2003/0087691 A1 | | 5/2003 | Kiely et al. |
| 2003/0186739 A1 | | 10/2003 | Paulsen et al. |

FOREIGN PATENT DOCUMENTS

| | | |
|---|---|---|
| GB | 2193441 | 2/1988 |
| GB | 2205188 | 11/1988 |
| JP | 9140897 | 6/1997 |
| WO | WO00/03775 | 1/2000 |
| WO | WO00/16864 | 3/2000 |
| WO | WO00/77682 | 12/2000 |
| WO | WO00/16864 | 3/2001 |
| WO | WO01/16864 | 3/2001 |
| WO | WO01/16888 | 3/2001 |
| WO | WO01/83062 | 11/2001 |
| WO | WO02/21467 | 3/2002 |
| WO | WO02/25494 | 3/2002 |
| WO | WO 02/25560 | 3/2002 |

OTHER PUBLICATIONS

IGWB, Sep. 1997.*
Patents Act 1977 Examination Report under Section 18(3) for App. No. GB0307662.7.
Patents Act 1977: Search Report under Section 18(3).
Jyoti Shamdasani, "Examiner's report No. 2 on patent application No. 2003203543 by IGT". Apr. 10, 2006. 2 pages.
Canadian Office Action issued on Dec. 7, 2006. 6 pages.
Office Action issued on Dec. 14, 2006 for Application No. GB0307663.5.
First Report for Australian Patent Application No. 2006201826 dated Mar. 11, 2008.
Office Action on Jun. 5, 2008 for Application No. 2,424,421.
Office Action on Jun. 9, 2008 for Application No. 2,424,420.
CA Office Action dated Jul. 25, 2006 for CA Patent Application No. 2,424,421.
GB Examination Report dated Jul. 26, 2006 for GB Patent Application No. GB0307663.5.
"Pocket PC—The Wireless Wonder Turns 1," available at: http://www.microsoft.com/presspass/features/2001/apr01/04-18pocketpc.mspx.
AU Examination Report dated Aug. 17, 2006 for AU Patent Application No. 2003203542.
AU Examination Report dated Dec. 23, 2008 for AU Patent Application No. 2007200126.
AU Examination Report dated Jun. 2, 2009 for AU Patent Application No. 2007202835.
CA Office Action dated Jun. 16, 2009 for CA Patent Application No. 2,424,420.
US Office Action dated Aug. 19, 2005 issued in U.S. Appl. No. 10/188,415.
US Final Office Action dated May 8, 2006 issued in U.S. Appl. No. 10/188,415.
US Final Office Action dated Sep. 6, 2006 issued in U.S. Appl. No. 10/188,415.
US Office Action dated Feb. 7, 2007 issued in U.S. Appl. No. 10/188,415.
US Final Office Action dated Jul. 26, 2007 issued in U.S. Appl. No. 10/188,415.
US Advisory Action dated Oct. 18, 2007 issued in U.S. Appl. No. 10/188,415.
US Office Action dated Dec. 31, 2007 issued in U.S. Appl. No. 10/188,415.
US Final Office Action dated Aug. 15, 2008 issued in U.S. Appl. No. 10/188,415.
US Office Action dated Feb. 20, 2009 issued in U.S. Appl. No. 10/188,415.
US Final Office action dated Nov. 10, 2009 issued in U.S. Appl. No. 10/188,415.
US Examiner's Interview Summary dated Jan. 28, 2010 issued in U.S. Appl. No. 10/188,415.
US Notice of Allowance and Allowability and Examiner's Amendment dated Feb. 24, 2010 issued in U.S. Appl. No. 10/188,415.
US Supplemental Notice of Allowability, Examiner's Amendment and Interview Summary dated Mar. 11, 2010 issued in U.S. Appl. No. 10/188,415.
US Office Action dated Sep. 7, 2005 issued in U.S. Appl. No. 10/244,111.
US Final Office Action dated Feb. 21, 2006 issued in U.S. Appl. No. 10/244,111.
US Office Action dated Aug. 11, 2006 issued in U.S. Appl. No. 10/244,111.
US Office Action dated Mar. 26, 2007 issued in U.S. Appl. No. 10/244,111.
US Examiner Interview Summary dated Aug. 1, 2007 issued in U.S. Appl. No. 10/244,111.
US Final Office Action dated Oct. 10, 2007 issued in U.S. Appl. No. 10/244,111.

US Office Action dated Apr. 25, 2008 issued in U.S. Appl. No. 10/244,111.
US Final Office Action dated Nov. 26, 2008 issued in U.S. Appl. No. 10/244,111.
AU Second Examiner's Report dated Jan. 18, 2010 issued in Australian Appln No. 2007200126, 3 pp.

Forsman, Sarah (1997) "OLAP Council White Paper," (On-Line Analytical Processing) White paper [online]. San Rafael, CA.; [retrieved on Dec. 19, 2002] Retrieved from the internet: http://www.olapcouncil/org/research/whtpapco.htm 4 pages.

* cited by examiner

FIG. 17

| HPMonCE | 3:16p |
|---|---|

Name: Deryn Kiely
Account: 74444444
Comps: 100
Comps/Theo: 125%
Comps/Actual: 133%
What if: 50
Comps/Theo: 188%
Comps/Actual: 200%
Theo Win: 80
Actual Win: 75
[Calculate]

FIG. 18

| HPMonCE | 3:11p |
|---|---|

Deryn Kiely

[Write full Name]
[Write preferred Name]
☑ Scrolling
[Send it] [Cancel]

Date: 28-Aug-2001

| Asset Number | Section | Zone | Time | User Name |
|---|---|---|---|---|
| 22222 | 07 | 01 | 12:30:00 | Joe Employee |

| Patron Number | Full Name | Preferred Name |
|---|---|---|
| 123456 | John Doe | John |
| | | |

FIG. 19

SYSTEM, METHOD AND INTERFACE FOR MONITORING PLAYER GAME PLAY IN REAL TIME

RELATED APPLICATIONS

This application claims priority to U.S. Provisional Patent Application Ser. No. 60/281,875 filed Apr. 4, 2001.

FIELD OF THE INVENTION

The present invention relates to a system for monitoring or tracking the play of one or more gaming devices, including the play of players of the gaming devices, and interfaces for presenting such information.

BACKGROUND OF THE INVENTION

Casinos and other operators of gaming devices frequently offer incentive programs to the players of their games. These incentive programs generally reward a player for the frequency of their play or the "volume" of their play, such as measured by time of play, amounts wagered, or amounts won.

Generally, a player signs up with a casino to participate in their player reward program. By signing up, the casino learns the identity of the player. The casino generates a player file with which the player's identity is associated. The casino then tracks the player's play of its games in order to determine when and if the player is entitled to a reward.

In order to track the player's play, the casino may offer the player a player tracking card. This card has information associated with it, such as a unique player number. This player number is also associated with the generated file for that player. A card reader is located at the casino's gaming device. When the player wishes to play a game, the player utilizes the card reader to read their player card. The player or other identification number is transmitted to a computer which accesses the player's file. Information regarding the player's activities, such as number of games played, amounts wagered or won, are transmitted from the gaming machine to the computer. This information is utilized to update the player's file with play or reward information.

Commonly, activities of a player are associated with points. The points are assigned based on the player's activities. For example, a player may be awarded a point for each dollar which is wagered. The wager information may be used to generate reward points. Over time, the player's file is updated to reflect accrued reward points.

When a player has engaged in a certain level or volume of play, such as evidenced by a number of points accrued, then the player may be entitled to a reward. A player may travel to a central station where the player may check their point total. The player may also compare their point total to the number of points necessary for particular awards. These awards may comprise goods or services, such as free or discounted food, lodging and other awards.

This type of system has the advantage that the player is rewarded for the loyalty of play at a particular casino. Such a reward is based upon the player's frequency or volume of play, and is apart from any winnings which the player may have received as a result of playing individual instances of a game or gaming machine. The casino benefits by having players return to their property to play their games.

Casinos would like more flexibility in determining whether and when to award a player a reward. For example, instead of waiting for a particular player to accrue points over time, a casino may wish to reward a player for playing at their property an extended duration of time. By rewarding the player for their play during that time, the player may be immediately enticed to play more or return sooner.

As another example, depending upon the type of game which a player is playing or the results of the game play, a casino might wish to offer the player an immediate reward. For example, if one player is playing a $0.05 (i.e. "nickel") wager slot machine and another is playing a $1.00 (i.e. "dollar") wager slot machine, even though both players may have the same net "win" over time, the casino may wish to offer the player playing the dollar wager machine a reward sooner, knowing that the player is more likely to produce greater income faster for the casino than the other player.

Presently, such options are not available. The casino operator may simply check the player's file to determine the player's total number of points and when points were awarded. A system and method which permits the monitoring of gaming machines and player activities is desired.

SUMMARY OF THE INVENTION

The present invention comprises one or more systems, methods and interfaces for monitoring game play, including the activities of one or more game players as they play games.

One embodiment of the invention comprises a system for monitoring the play of one or more games, such as games played on gaming machines, games played at tables or at/on other devices. In one embodiment the system includes at least one gaming machine or other device which generates game play data. The gaming machine may also be adapted to accept player information, such as a player identification associated with a player card.

The system also includes a game play monitoring host. The host preferably comprises a computing device for manipulating/processing data or information, such as storing or collecting the information in a memory, aggregating or transforming the information, and presenting the information on a display.

The system includes a communication link between the gaming device and a host. Game play data, such as player identification information, gaming machine identification information, wager, payout and other information may be transmitted to the host.

In one embodiment, the invention comprises an interface for use in displaying the game play information and engaging in actions associated with the data. The interface includes at least one window for displaying the game play information. Menus and icons are provided which allow a user to engage in actions such as filtering and report generation.

In accordance with a method of the invention, game play information from one or more gaming machines or other devices is transmitted to the host. This information may be displayed using the interface. Preferably, the information is transmitted as game play or other game events occur, and the information is continuously updated. In this manner, real-time game play information regarding one or more gaming machines or gaming events may be monitored.

In embodiment of the invention, the game play and other information is displayed on a display of a portable device, such as a hand-held wireless device. In this manner, casino personnel located on the floor of the casino can obtain game play data.

In one or more embodiments, the method includes activities associated with the game play information or data, such as filtering of the data for display of particular game play related information. The activities may also comprise the generation of particular game play related information or data reports, the storage of the data, or the exportation of the data to another device or system. In one or more embodiments, the method includes displaying in graph, table, text or other form game play information such as the number of gaming machines in use or gaming events presently occurring, the identity of players of those games/events, wager, payout and other information. Preferably, the method includes the monitoring of particular player activities in real-time, such as the wager volume of a player playing a game. Such information can be used to target one or more players for particular marketing efforts, such as the award of a bonus or other reward for their play or as enticement for further play.

In one embodiment, the collected game play information is compared to certain criteria to determine a status of the player, game or the like. The status is illustrated graphically, such as at the hand-held device. The graphical representation of the status may comprise, for example, a colored icon or symbol.

One embodiment of the invention comprises a method for providing an award to a player. In this embodiment, a user of the hand-held device inputs information causing award information to be generated. The award information may be printed on a ticket or voucher from a printer associated with the hand-held device or at an associated local printer. The user may then deliver the award voucher directly to the player. In another embodiment, the award information may be generated and then transmitted in electronic form to the player. The award information may be displayed on the display of a gaming machine.

In one embodiment, the awards may be "comps" or complimentary awards. These awards may be provided based upon a variety of criteria. One embodiment of the method comprises examining a player's game play data in order to determine if a comp or other award should be issued. The award may be issued against points accrued to the player, against value, or be entirely independent of the player's game play. In one embodiment, the selection of the particular source or type of the award is input to the hand-held device.

A variety of other aspects of the invention are provided. These include directing messages to a player during their game play from, for example, a hand-held device. The user of the hand-held or other device displaying information may be permitted to alter the information which is display, including the interface. One aspect of the invention comprises the step of determining the identity and/or location of a player, including by use of the hand-held device.

Further objects, features, and advantages of the present invention over the prior art will become apparent from the detailed description of the drawings which follows, when considered with the attached figures.

DESCRIPTION OF THE DRAWINGS

FIG. 17 illustrates one embodiment of a screen which may be displayed by a device of a system of the invention to provide calculated actual and theoretical information;

FIG. 18 illustrates one embodiment of a message screen which may be displayed by a device of a system of the invention;

FIG. 19 illustrates one embodiment of a winner screen which may be displayed by a device of a system of the invention.

DETAILED DESCRIPTION OF THE INVENTION

The invention is a system, method and interface for tracking or monitoring game play by one or more players. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One or more embodiments of the invention comprise a game play monitoring system. The game play monitoring system is adapted to permit the monitoring of the gaming activities of one or more players from a remote location. Other aspects of the invention comprises methods of monitoring game play and one or more interfaces for presenting game play information. The invention also comprises methods for utilizing player game play and similar information for various purposes, including real-time, remote issuance of awards such as "comps," sending messages to players, calculating game play information based upon award values, implementing promotions, and locating players.

Figure 1:
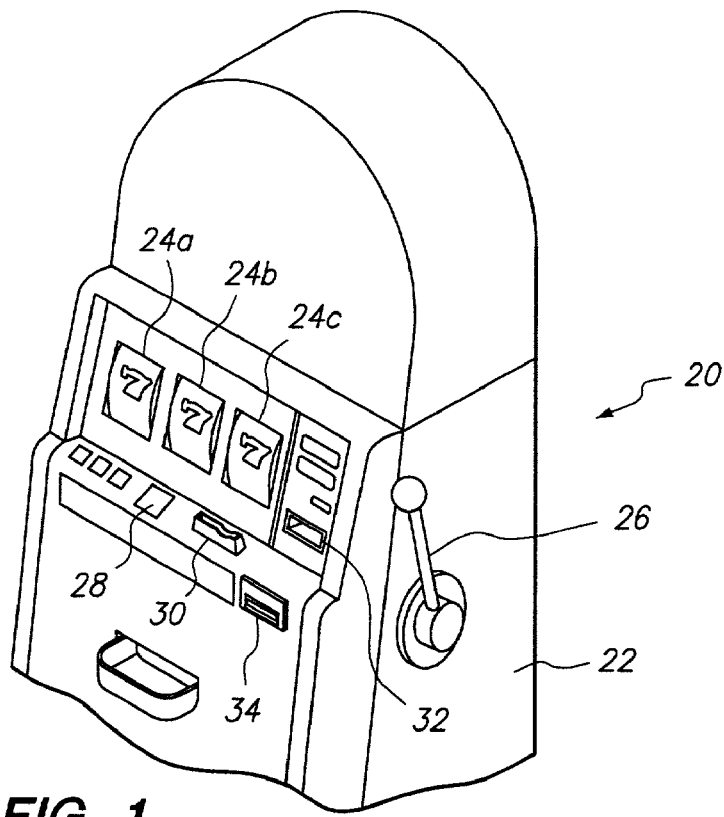
FIG. 1 illustrates a gaming machine of one type which may be monitored in accordance with the invention.

FIG. 1 illustrates one embodiment of a gaming machine or device 20 which may be monitored. In general, the gaming machine 20 is adapted to present at least one game for play to a player. As illustrated, the gaming machine 20 includes a housing 22 which supports and/or houses the various components of the gaming machine 20. In the embodiment illustrated, the gaming machine 20 is adapted to present a game of "slots," and includes three rotating reels 24a,b,c. A handle 26 or spin button 28 may be used to effectuate rotation of the reels 24a,b,c.

In this well known game, a player may be awarded an award if the result of the rotation of the reels 24a,b,c is a predetermined combination of symbols. It should be understood that the gaming machine 20 may be adapted to present one or more of a wide variety of games. Depending upon the game presented, the configuration of the machine may vary. For example, in the event the gaming machine 20 is adapted to present the game of video poker, then the gaming machine 20 may include a video display.

In one or more embodiments of the invention, the gaming machine 20 is adapted to present a wager-type game. In this arrangement, a player is required to place a bet or wager in order to participate in the game. In the event the outcome of the game is a winning outcome, then the player may be provided with an award. In one arrangement, the award may be winnings in proportion to the amount wagered or bet by the player.

In order to accept a wager, the gaming machine 20 may include a coin acceptor 30 for accepting coins. The gaming machine 20 may also include a bill acceptor or validator 32 for accepting paper currency. The gaming machine 20 may be provided with other means for accepting or verifying value, such as a credit card reader.

In a preferred embodiment of the invention, the gaming machine 20 includes a card reader 34 or other device associated with a game play monitoring system. As illustrated, the card reader 34 comprises a magnetic stripe reader for reading encoded information from a magnetic stripe of a player card. The card reader may be of other types, as is now known or later developed, such as for reading a smart card or bar-coded information.

Figure 2:
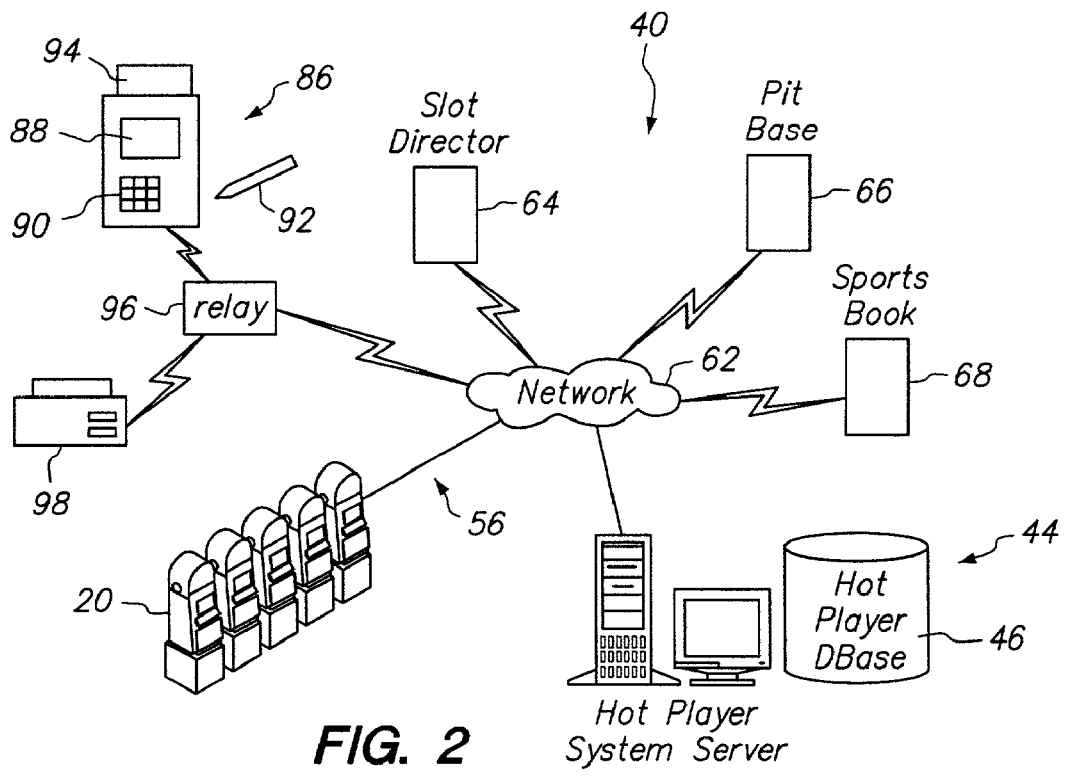
FIG. 2 illustrates a game play monitoring system in accordance with one embodiment of the invention, the system including at least one gaming machine and a game play monitoring system host associated with a network.

In accordance with the invention there is provided a game play monitoring system 40. One embodiment of such a system is illustrated in FIG. 2. The game play monitoring system 40 includes one or more gaming machines or devices. These gaming machines may be similar to the gaming machine 20 illustrated in FIG. 1. The gaming machines or devices may have a wide variety of other configurations, and in general may comprise any game which a casino or other entity wishes to monitor. For example, the gaming device may actually comprise a table game, such as a game table adapted to present the game of "Twenty-One" to one or more players. In such event, the table or other game presentation device may include one or more devices arranged to permit implementation of the system and method as detailed below. Such devices may include coin or token acceptors for accepting bets or wagers by each player, and a card reader for reading a player card. In a preferred embodiment, information such as rate of play, average bet and time played may be input into a device by a dealer or other game operator as the game is played. The game play monitoring system 40 may also be adapted to monitor the play of other gaming devices or other game events. Such games/devices may include bingo, keno, and sports or other betting events.

In a preferred embodiment, the game play monitoring system 40 includes a plurality of gaming machines 20 or is adapted to monitor a plurality of game events, such as those not presented on a machine per se. In general, it is desirable to have as many of the gaming machines or devices as are offered for play by players associated with the system, as such permits obtaining the most accurate information regarding game play.

In a preferred embodiment, the gaming machines 20 are associated with a game play monitoring system host 44. One or more appropriate communications links, whether wired or wireless, permit information to be transferred to and from each gaming machine 20 and the game play monitoring system host 44. The game play monitoring system host 44 may comprise a single computer or a group of computers associated with one another on a network.

In one embodiment, the game play monitoring system host 44 is adapted to monitor play of the one or more gaming machines 20, including the activities of specific players. The game play monitoring system host 44 is preferably arranged to obtain game play information, and manipulate that information, such as by aggregating game play data and displaying game play information. As detailed below, the game play information which is obtained and monitored may comprise a wide variety of information, such as the length of time of game play, amounts bet, amounts awarded, and a wide variety of other information. The game play data or information preferably also includes information regarding the player of the gaming machine or game event, such as the identity of the player. The game play monitoring system host 44 may also store information regarding game play, including individual player game play. As detailed below, the game play monitoring system host 44 is preferably adapted to display game play information to a user of the system 40.

In one embodiment, the game play monitoring system host 44 includes at least one data storage element 46 for storing the player information. The data storage element 46 may comprise a hard drive, RAM, ROM, tape drive, CD, DVD or other memory or data storage member or element.

Figure 3:
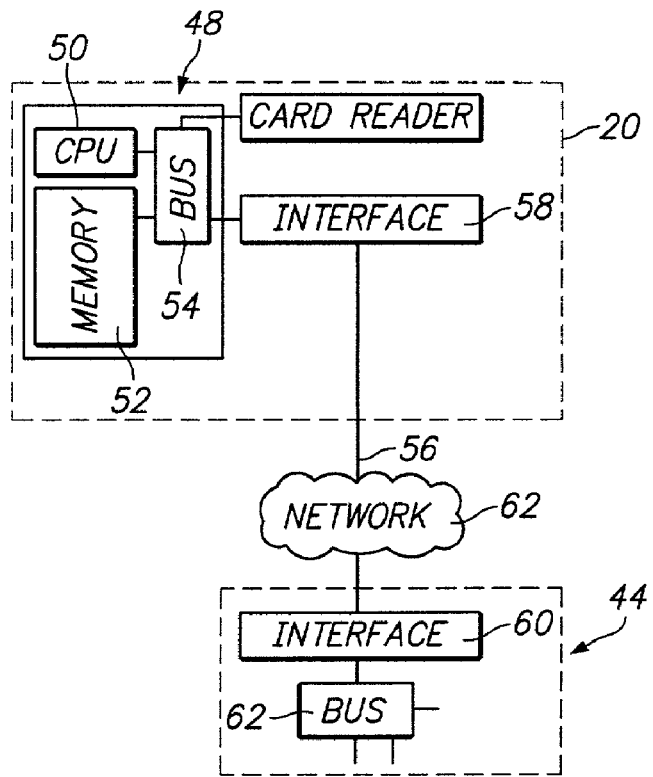
FIG. 3 illustrates a gaming machine controller, a game play monitoring system host and a communication pathway of the network linking the host and controller in accordance with one embodiment of the invention.

In a preferred embodiment of the invention, a communication link is established between the gaming machine 20 at which game play is to be monitored and the host 44. As illustrated in FIG. 3, the gaming machine 20 preferably includes a gaming controller 48. In one embodiment, the gaming machine controller 48 includes a processing device 50, such as one of the many readily commercially available processors such as those manufactured by AMD, Sun Microsystems and Intel. The gaming machine controller 48 also includes a memory 52 or other information storage device for storing data. The memory 52 may be of a variety of types, such as RAM, SDRAM, DRAM, EEPROM and ROM. In one or more embodiments, the gaming machine controller 48 may include a mass storage device such as a hard drive, CD-ROM, DVD or the like for storing larger quantities of data.

In one embodiment, the various devices of the gaming machine controller 48 are associated with a bus 54. The bus 54 may be of a variety of types. In one embodiment, the bus 54 is a bi-directional system bus which may contain, for example, thirty-two address lines for addressing a video memory or main memory. The bus 54 preferably also includes a thirty-two or sixty-four bit data bus for transferring data between and among the components associated with the bus 54. Alternatively, multiplex data/address lines may be used instead of separate data and address lines.

A variety of devices/components may be associated with the bus 54. For example, the card reader 34 may be associated with the gaming machine controller 48 via the bus 54. As will be appreciated, though not illustrated, a number of other devices of the gaming machine 20, such as the display, bill validator, coin acceptor and the like may be associated with the gaming machine controller 48 via the bus 54. In this arrangement, data, such as operational instructions, may be sent from the gaming controller 48 to the peripheral or other device, and data may be sent from the peripheral or other device to the gaming machine controller 48.

The peripheral or other devices, such as the card reader 34 may be connected to the system bus 54 in a variety of manners, such as via a wired RS-232 connection, a USB connection, or even a wireless communication link. It will be appreciated that in those cases, appropriate devices/interfaces may be provided.

As illustrated in both FIGS. 2 and 3, a communications link 56 is provided between the gaming machine (such as the gaming machine controller 48 and the game play monitoring system host 44). This link may be a wired or wireless communication link. In a preferred embodiment, as illustrated in FIG. 3, a network or communication interface 58 is associated with the bus 54 of the gaming machine controller 48. The network interface 58 is adapted to permit two-way communication from the gaming controller 48 to a remote location.

Likewise, a network interface 60 is associated with the game play monitoring system host 44. This network interface 60 may also be associated with a bus 62 of the host 44.

The protocol/architecture of the communications link, including the network interfaces 58,60 associated with the gaming machine controller 48 and game play monitoring system host 44 may vary. For example, if the link is a wireless link, the protocol/architecture may be Bluetooth or IEEE 802.11(b). For wired links, the protocol/architecture may be RS-232, IEEE-1394 (Firewire™), TCP/IP or Ethernet.

In one embodiment, the communication link 56 is part of a communication network 62. This network 62 may have a variety of configurations, and as noted above may comprise wired, wireless or a combination of wired and wireless communication pathways. Depending upon the configuration of the network 62, the network 62 may comprise a wide variety of components. For example, the network 62 may include wireless communication relays or transceivers. The network 62 may also include one or more hubs or routers. The network 62 may include dedicated or public lines. For example, one or more portions of the network 62 may include the Internet, phone lines or the like. In general, the network 62 is simply adapted to permit the transmission of data or information (whether in analog and/or digital form) between the gaming machine 20 and the game play monitoring system host 44.

Figure 4:
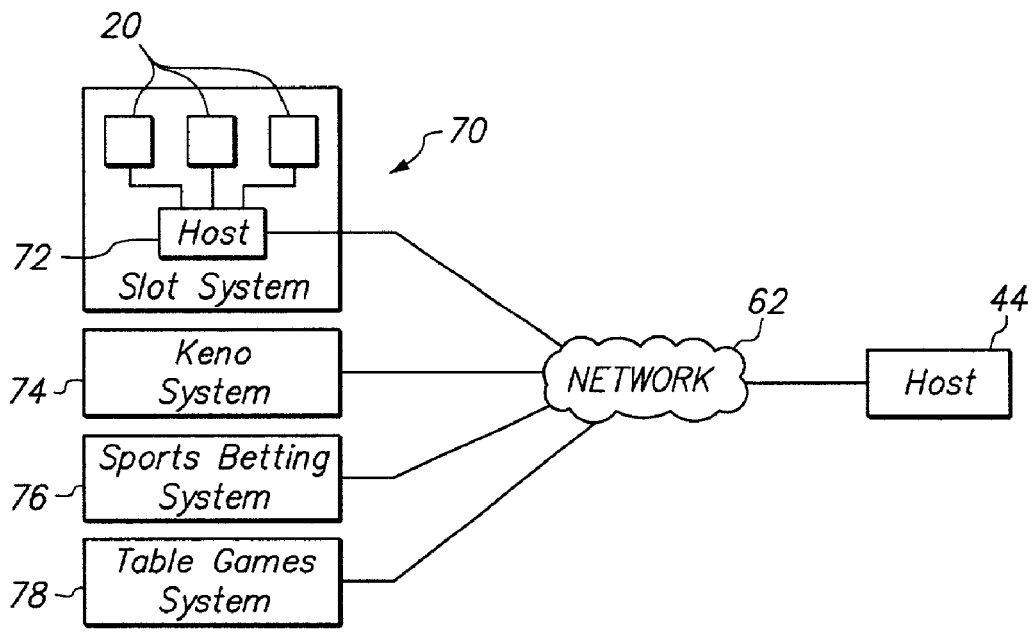
FIG. 4 illustrates another embodiment of a game play monitoring system in accordance with the invention where a plurality of individual game systems are associated with a game play monitoring system host via a network.

As illustrated in FIGS. 2 and 4, a number of other devices or systems may be associated with the network 62 or otherwise be in communication with the game play monitoring system host 44. For example, as illustrated in FIG. 2, a variety of personnel/entities may be permitted to gain access to the information which is monitored and manipulated. As illustrated, a slot director may obtain access to the network 62 via a first remote station 64, one or more pit bosses through other remote stations 66, and sports book personnel or a sports book director through additional stations 68. Such stations 64,66, 68 preferably include a display for presenting information, one or more input devices for accepting user input, such as a mouse or keyboard, and a communications interface.

As illustrated in FIG. 4, in one embodiment of the invention, various devices may be associated with a first system or network, which system or network is then associated with the network 62 which includes the game play monitoring system host 44. For example, a casino may already have a slot system 70 for controlling the one or more slot-type gaming machines 20. As illustrated, the slot system 70 may include a gaming machine host 72. Each gaming machine 20 may be associated with the host 72 via a communication link (in similar fashion to that illustrated in FIG. 3). The gaming machine host 72 may be used to monitor security functions of the gaming machine 20 and provide instructions or data to the gaming machine 20.

In accordance with the present invention, the slot or other such system 70 is associated with the network 62, thus permitting data or information to flow between the individual gaming machines 20 and/or gaming machine host 72 and the game play monitoring system host 44.

Likewise, as illustrated in FIG. 4, a number of other systems or devices may be associated with the network 62, and thus the game play monitoring system host 44. For example, a keno system 74, sports betting system 76 and table games system 78. Each of these systems 74,76,78 may themselves include a variety of devices or elements, and may be arranged to generate and transmit information in a variety of forms or manners. For example, the sports betting system 76 may be particularly adapted to aggregating and manipulating sport bet data or information.

Referring to FIG. 2, in one or more embodiments of the invention the system 40 may include one or more portable transaction devices (PTDs) 86. In one embodiment, the PTD 86 is a portable device capable of transmitting and receiving information via a wireless communication link/network.

In one embodiment, the PTD 86 is generally comprised of a display screen 88 adapted to display a wide variety of information. The information may be generated by a microprocessor of some type (not shown) within the PTD 86. Examples of the hand-held PTD 86 which may accommodate the functions of the system 40 are manufactured by Symbol Technologies, Incorporated of Holtsville, N.Y., and the Hewlett-Packard Company. In one embodiment, the microprocessor may be configured to run an operating system capable of performing functions, such as the Windows CE™ operating system.

The information which is to be displayed may be generated by the microprocessor and stored in a local memory, or the data may be transmitted to the PTD 86 from a remote location.

In one embodiment, the PTD 86 includes means for permitting a user to input information, such as information requests. In one embodiment, this means includes one or more keys 90 and/or a stylus 92. In one embodiment, the stylus 92 may be utilized in conjunction with the display screen 88 to make selections from menus and the like, as described in more detail below. Other input devices may be provided, such as a touch screen.

Though not illustrated, the PTD 86 may include a card reader for reading player tracking cards (such as a smart card, magnetic stripe or bar code reader). In one embodiment, the PTD 86 includes a printer 94. The printer 94 may be of a variety of types, including thermal. In one embodiment, the PTD 86 may be utilized to print tickets or receipts.

As indicated, the PTD 86 preferably includes a communication interface permitting a communication link to be established with one or more other devices. In one embodiment, the PTD 86 is configured to communicate with one or more devices, such as a network host (not shown) through a wireless communication link. In this manner, the PTD 86 may be transported freely from location to location, such as within the area of a casino.

In one embodiment, the system 40 may include one or more relays 96 adapted to retransmit signals to and from the PTDs 86 of the system 40. In one embodiment, the PTD 86 is associated with the network 62 by a wireless communication link, and may communicate with other devices associated with the network 40, such as the game play monitoring system host 44 by a variety of communication links or paths, wired or wireless. In another embodiment, the PTD 86 may communicate with such other devices directly in a pier-to-pier type format.

In one embodiment, the system 40 also preferably includes at least one printer 98. The printer 98 may be of a variety of types, and in one embodiment is configured to print tickets or receipts. The printer 98 may be connected to the network 62, or the PTDs 86 and may communicate therewith directly, such as via a wireless communication link.

Operation of the game play monitoring system 40 and various methods of monitoring game play will now be described in detail with reference, where applicable, to the figures. Referring to FIG. 2, in the preferred embodiment of the invention, game play information is transmitted to the game play monitoring system host 44 regarding each gaming machine 20 or other game play device/event (such as devices and events associated with a table game, such as a Blackjack or Poker table).

In one embodiment, game play information regarding a particular player's activities is transmitted to the game play monitoring system host 44. When a player wishes to engage the play of the gaming machine 20 or other gaming device/event, the player may identify themselves. In one embodiment, a player identifies themselves with their player card. As noted above, such a card may be encoded with identification information. When using the gaming machine 20 such as that illustrated in FIG. 1, the player may insert their player card into the card reader 34. The card reader 34 reads the information from the card and then transmits the information. As illustrated in FIG. 3, the identification information may be transmitted directly from the gaming machine 20 to the game play monitoring system host 44. As illustrated in FIG. 4, the information may first be transmitted to the gaming machine system host 72 and then to the game play monitoring system host 44.

In one embodiment, player identification information may be stored at the game play monitoring system host 44, such as in the memory 46 (FIG. 2). In response to a player identification code or number, such as read from the player card, more detailed information regarding the player may be obtained from the memory. In another embodiment, such detailed information may be stored remotely and either obtained by or transmitted to the game play monitoring system host 44. For example, the player card may have an encoded identification code, such as AX18329IK. This code may be associated with the player known as John Doe. A file may be associated with the player's code, which file includes a variety of information such as the full name and address of the player, their telephone number, accrued points, and other data. In response to receiving the player's code, the game play monitoring system host 44 may obtain information regarding the player from the file or other location.

Game play information is also transmitted to the game play monitoring system host 44. For example, the gaming machine 20 may transmit information regarding a player's wagers, time play began, time play ended, awards or payouts, and other information. The game play information is preferably generated at the gaming machine 20 or other device. The information may be aggregated and then transmitted at intervals, such as predetermined intervals of time, to the system host 44. In certain embodiments of the invention, the transmitted information may comprise "point" or similar information. The gaming machine 20 or other device may be configured to generate point information based upon particular player events, such as the placing of bets. This point information may be transmitted to the host 44.

Of course, the gaming machine 20, slot system 70, or other device/element may be adapted to utilize a particular communication format or format data or information in one or more manners which is different from that of other systems. In a preferred embodiment, the game play monitoring system host 44 is provided with an interface allowing the data in different forms to be integrated and presented cohesively.

In one or more embodiments, the game play data or information is utilized by the game play monitoring system host 44. In one embodiment, some or all of the information may be stored, such as in the memory 46. In one or more embodiments, some or all of the information may be manipulated, such as aggregated or transformed. The information may also be displayed in one or more formats for viewing.

Figure 5:
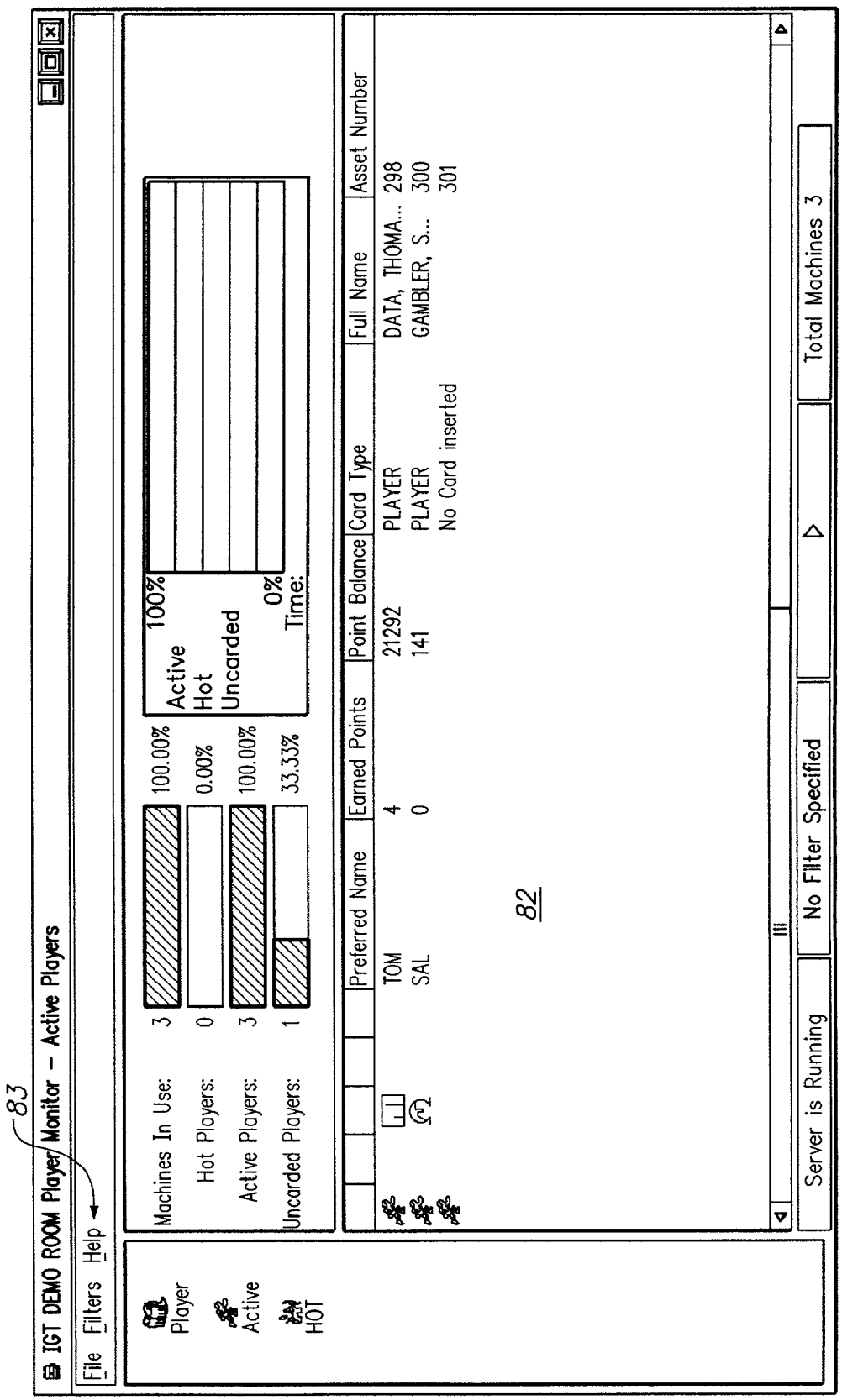
FIG. 5 illustrates a graphical user interface for presenting game play data or information in accordance with an embodiment of the invention.

FIG. 5 illustrates one embodiment of a graphical user interface 80 which is useful in presenting game play information and permitting input by a user of the system for performing actions relative to the data or information. Though not illustrated, such an interface 80 may be displayed on a display associated directly with the game play monitoring system host 44 (such as controlled by a processor thereof) of the system 40 illustrated in FIG. 2. Alternatively, the interface 80 may be displayed on a display of another device associated with the host 44. For example, the interface 80 may be displayed on a display of one of the stations 64,66,68 or the PTD 86 illustrated in FIG. 2.

Figure 9:
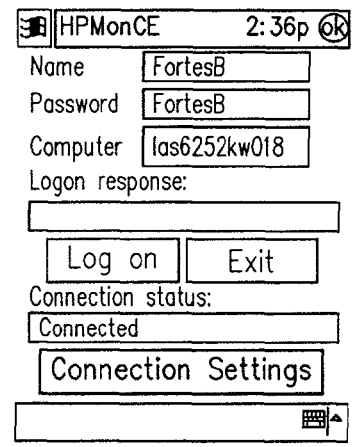
FIG. 9 illustrates one embodiment of an access or log-in screen which may be displayed by a device of a system of the invention.

In accordance with one or more embodiments of the invention, a user of a device of a system of the invention may be required to provide identification or authentication in order to gain access to the system and utilize the various features thereof, including obtaining the above-described information. For example, as illustrated in FIG. 9, an interface or screen may be displayed at or by the device (such as PTD 86 of FIG. 2) which requests a user's identification or authorization code and password in order to utilize the device and gain access to the interface 80 illustrated in FIG. 5. The particular interface or screen which is displayed may vary depending upon the particular device. For example, the interface displayed by the stations 64,66,68 of the system 40 illustrated in FIG. 2 may vary from the interface display by the PTD 86.

Figure 8:
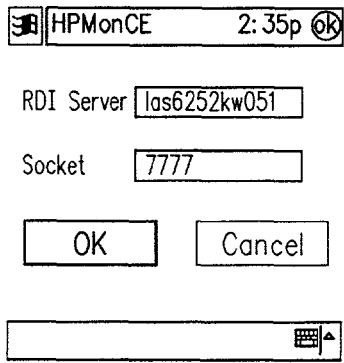
FIG. 8 illustrates one embodiment of a connection screen which may be displayed by a device of a system of the invention.

As illustrated in FIG. 8 a screen or other interface may be generated and indicate the status of a communication link between the device and another device or devices of the system. For example, in the system 40 illustrated in FIG. 2, the PTD 86 may be configured to display the screen indicating to the user the status of a wireless communication link from between the PTD 86 and the host 44.

Figure 10:
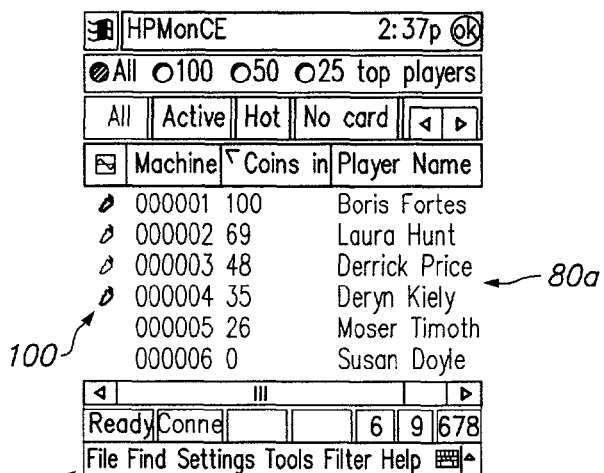
FIG. 10 illustrates another embodiment of a graphical user interface of the invention configured to display information regarding player play activity, the interface particularly suited to be displayed on a hand-held device.

Once authorization/access is established, if such is required, then the user may be permitted to access other information and features of the system. One feature may be the interface 80 as illustrated in FIG. 5 which is adapted to display game play information and to receive user input for engaging in a wide variety of actions. FIG. 5 illustrates one interface 80 in accordance with the invention specifically adapted for display at a standard monitor, such as associated with a desk-top station. FIG. 10 illustrates another embodiment of such an interface 80a which is specifically adapted to be displayed on a smaller screen, such as that associated with a hand-held device like the PTD 86 of the system illustrated in FIG. 2.

The one or more graphical user interfaces, such as the interfaces 80,80a illustrated in FIGS. 5 and 10 may be arranged to display a wide variety of information and implement a wide variety of functionality. In accordance with a preferred embodiment of the invention, the information is related to player gaming activity. Such information may include, but is not limited to the following: total number of gaming machines presently in use/play; the number of players of the gaming machines in use which are presently active or playing a game; the number of players of gaming machines who have provided their player identification information (or the number of players of machines who have not); the type of gaming machines which are being played; and a wide variety of other information.

As illustrated in both FIGS. 5 and 10, the interface 80,80a may be arranged to display detailed information regarding players or patrons, such as players of the gaming machines 20 of other devices of the system 40 such as illustrated in FIG. 2. If the player has identified themselves, such as by using a player card, then the information may include information from that player's file, such as the player's name, number of accrued points, nickname or preferred name and/or other information. If a player of a game has not identified themselves, then the player may be identified anonymously/generically.

The player and player game play information may be displayed in a variety of manners and in a variety of forms. For example, the information may be displayed in graphical format, such as a pie or bar graph. The information may also or alternatively be displayed in table or other format.

In one or more embodiments, referring to FIG. 5, the interface 80 includes a display area or window 82 in which the information may be displayed. This display area 82 may be divided into a plurality of areas, each displaying different information. The interface 80a illustrated in FIG. 10 may similarly include a variety of display areas.

As one aspect of the invention, the interface 80,80a may be arranged to display a graphical indication of a particular player's status relative to certain criteria. For example, graphical information may be provided which indicates a level of a player's play, such as related to amounts bet during a specified period of time. For example, as illustrated in FIG. 10, the graphical user interface 80a may include graphical information regarding a player's level of play, that graphical information comprising a symbol 100 having a specified color. The particular color of the symbol may indicate the level of play.

Figure 11:
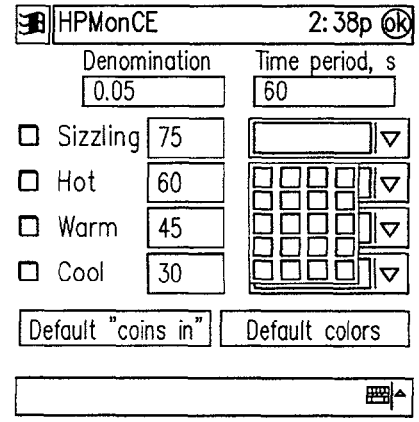
FIG. 11 illustrates one embodiment of a criteria selection screen which may be displayed by a device of a system of the invention.

In the embodiment illustrated, the symbol 100 is a chili pepper. Referring to FIG. 11, a specific color may be assigned to a particular "level" of play, and then a particular player's level of play indicated graphically by a chili pepper of that particular color. As illustrated in FIG. 11, a user may be permitted to change or adjust the criteria for determining a player's level or status, as well as the colors or other graphical indicators of that level or status. In the example illustrated, an interface is provided which permits the player to change a number of "coins in" during a period of time which define a particular level of play, and then also associate a particular color with each level. Default levels and colors may be provided.

Of course, other means may be provided for indicating the player's level or status graphically to the user of the device. Further, a wide variety of information may be displayed, including information which indicates a level or status of other activities of a player (other than rate of betting) such as a total number of games played by a player, the total time a player has played a particular machine, and other characteristics.

In one embodiment, the interface also includes a menu allowing a user to select one or more actions or activities. FIG. 5 illustrates one embodiment of such a menu 83. FIG. 10 illustrates another embodiment of a menu 83a associated with the interface 80a. The actions which may be implemented or accomplished using the menu may comprise changing the format of the display area, manipulating the information and presenting it in a different form, or engaging in administrative functions associated with the game monitoring system. The menu 83,83a may include both drop-down menus associated with keywords, and individual icons for initiating certain functions or actions.

Figure 12:
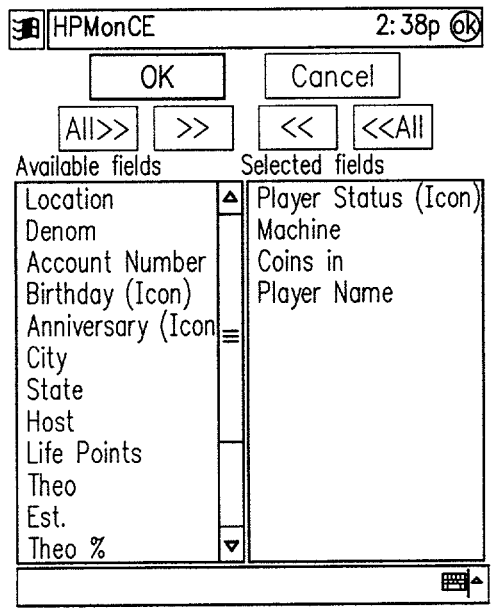
FIG. 12 illustrates one embodiment of a field selection screen which may be displayed by a device of a system of the invention.

Various of the menu items may result in the display of a specific screen of information. For example, in one embodiment a menu item may permit a user to indicate the status of a player using graphical information. A menu selection may cause the display of the screen illustrated in FIG. 11 and described above which permits a user to select various player levels and associated display colors. Another menu selection may, in the example illustrated in FIG. 12, result in the display of information permitting a user to select the information which is to be displayed in a window such as that illustrated in FIG. 5 or FIG. 10. For example, as illustrated in FIG. 12, a user may be permitted to select a number of information fields from a number of available fields.

Figure 13:
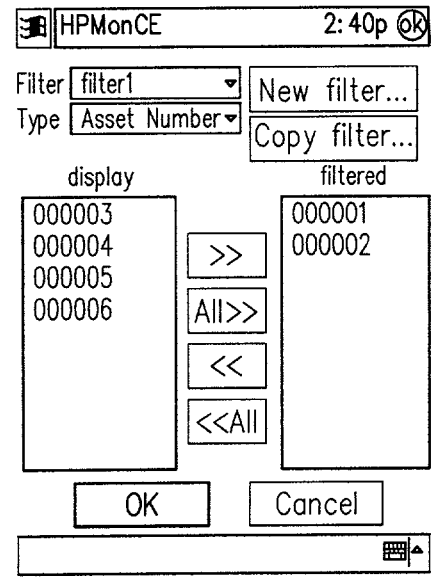
FIG. 13 illustrates one embodiment of a filter screen which may be displayed by a device of a system of the invention.
Figure 14A:
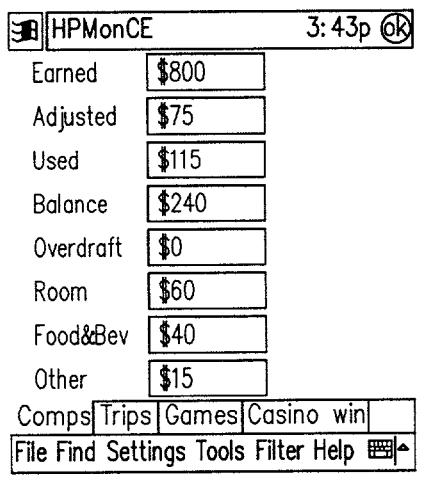
FIGS. 14a-d illustrates embodiments of player information screens which may be displayed by a device of a system of the invention.
Figure 14B:
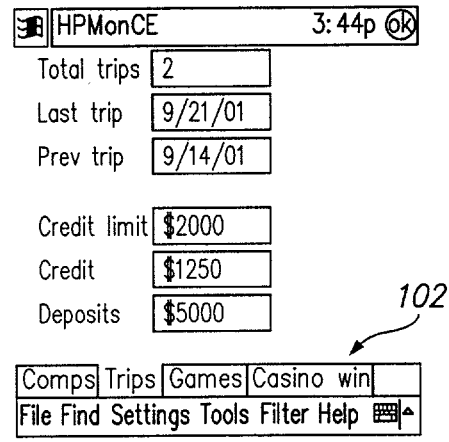
Figure 14C:
Figure 14D:

In one embodiment, the actions may comprise the generation of a report or the filtering of information. Software and/or hardware may be provided for implementing such a function. For example, with respect to the system 40 illustrated in FIG. 2, the software/hardware may be associated with the game play monitoring system host 44 for filtering the data and generating reports. The filtering function may be implemented through a graphical interface permitting a user to select specific filter functions, as illustrated in FIG. 13.

One report is adapted to display information regarding a player's play activities, including present play actions, such as most recent wagers and game results and the type of game played. The information may also include game play history, including a summary of play activity. Such information may include the games which the player plays and the amounts bet. FIGS. 14a-d illustrate information which may be displayed in response to a request for detailed information regarding the activities of a particular player. As illustrated, this information may include player account information, information regarding the number of visits of the player to the establishment, actual win and calculated theoretical win information, amounts bet over time, and a wide variety of other information. As illustrated, such additional displays may themselves include a menu 102 from which a user makes selections to implement other functions, such as the display of other information.

In one or more embodiments, information which is displayed may be continuously updated. One feature, which may be referred to as a "freeze" function, allows a user to freeze the information which is displayed. In this manner, the information is not updated, allowing the user to view and consider information displayed at one particular time for a period of time.

In one or more embodiments, a user may be permitted to open a plurality of windows or display areas at the same time, each window displaying different information. For example, a user may open a first window which displays information regarding the wager and payout activity of a first group of gaming machines, and a second window regarding a second group of gaming machines. In this manner, a user may view for comparison the information regarding the two groups of gaming machines.

Figure 15:
FIG. 15 illustrates one embodiment of a pop-up window or menu of a screen which may be displayed by a device of a system of the invention.

FIG. 15 illustrates one embodiment of the invention where a "pop-up" menu or window is generated and displayed in response to the selection of specific information or fields displayed in the main interface. For example, in one embodiment where the main interface is configured to display summary information regarding a plurality of selected fields from a group of possible fields, the user may be permitted to select specific summary information. Depending on the particular field type or other characteristic of the information, a menu may be displayed in this main display window. For example, as illustrated the pop-up menu 104 may include menu selections such as "message," "summary," "history," and "what if." The menu items "message" and "what if . . . " are described in more detail below. The menu items "summary" and "history" may result in the generation and/or display of much more detailed information regarding the selected field, such as summary or historical play information regarding the particular player which was selected.

In one embodiment, a user may be permitted to display information which was previously collected. As detailed above with respect to the system 40 illustrated in FIG. 2, in one or more embodiments, some or all of the information which is transmitted to the game play monitoring system host 44 may be stored in memory. In one embodiment, identifying information may be associated with this information, such as the date or time it was obtained, the gaming machine from which it was obtained or the like. A user may be permitted to view stored information, such as by requesting information regarding a particular prior time period.

Figure 6:
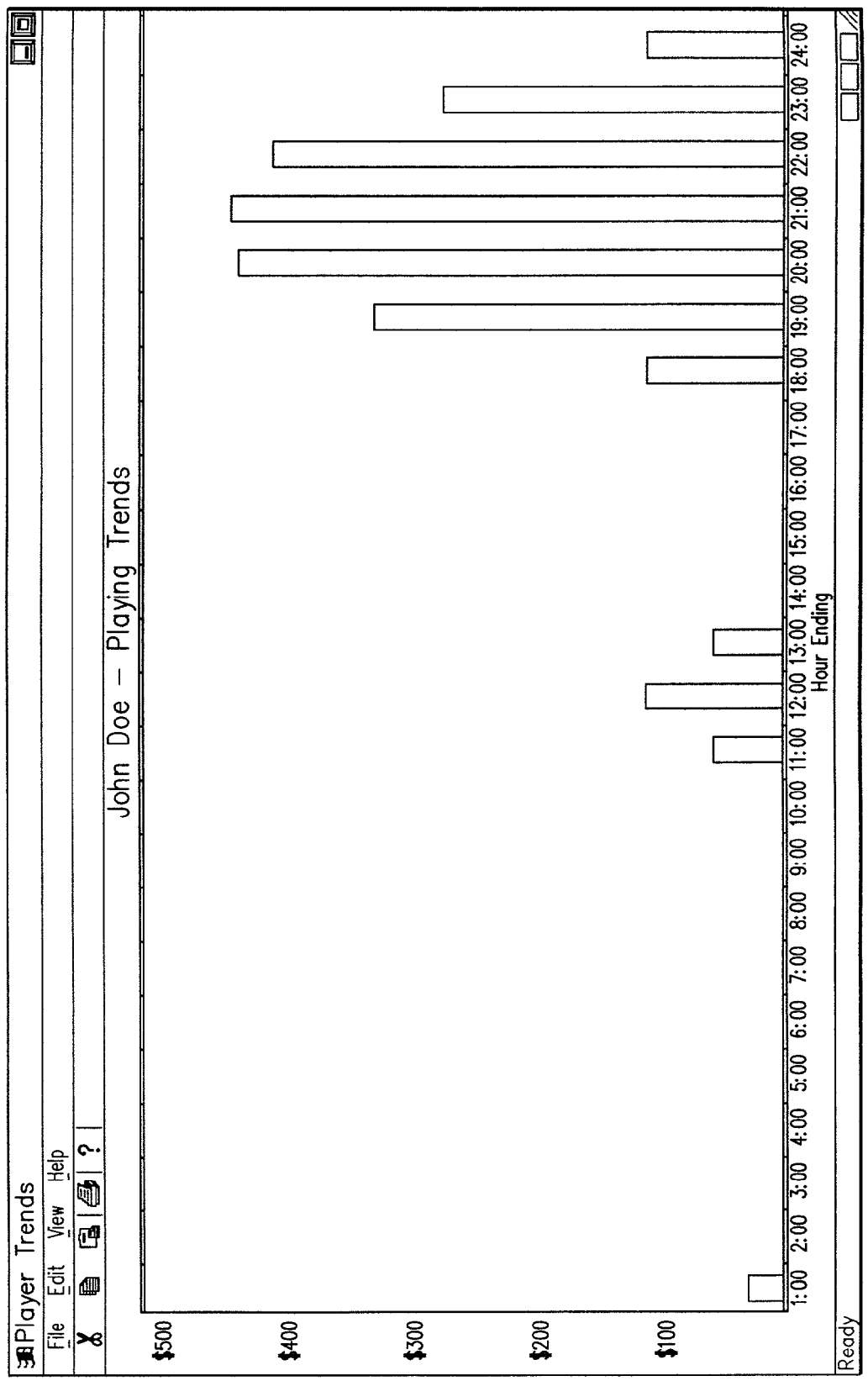
FIG. 6 illustrates a graphical user interface configured to display information regarding a player's wagering activity during periods of time.

In this fashion, a user may also obtain historical play data regarding a particular player. For example, the user of the host 44 of the system 40 illustrated in FIG. 2 may request information regarding the activities of a particular player, such as by inputting their name or identification code as a search filter, along with a date range. This allows a user to view the past play activity of the player. Illustrated in FIG. 6 is such an interface arranged to display a player's play information arranged by player wager volume per hour over a twenty-four hour period. Of course, other such information may be displayed in other configurations. As indicated with respect to FIG. 15, in one embodiment, such historical information may be generated in response to a menu selection, such as a "history" menu selection from the pop-up menu 104.

Figure 16:
FIG. 16 illustrates one embodiment of a player search screen which may be displayed by a device of a system of the invention.

In accordance with a method and system of the invention, a specific player or players may be located. In one embodiment of the invention, a user may input a player's name or identification number into a device (such as the PTD 86 of the system 40 illustrated in FIG. 2) to locate that player. For example, referring to the system 40 illustrated in FIG. 2, the host 44 may be configured to conduct a search for game data from a gaming machine, if any, which is being played by that player and transmit information identifying that gaming machine or other device. FIG. 16 illustrates one embodiment of an interface which may be utilized to implement a player search.

A user may also conduct specific searches for information such as a particular gaming machine (such as machine number), manufacturer, model, area, amounts paid, denominations and the like. A variety of information may be arranged to be displayed in response to a filter or search for such information (as described above in conjunction with FIG. 13).

One particular feature of a system and method of the invention is that ready identification of a player with particular characteristics may be accomplished. As indicated above, using the system it is possible to determine if a particular player is playing a game. In addition, however, it is possible to examine particular characteristics of play by that player. Using these characteristics, a casino or other entity can carefully target players for specific advertising/marketing. For example, a user of the system can determine, in real-time, the amounts which are being wagered and/or won by a player. Thus, the user can not only determine if a player is playing a game, but which players are betting or wagering the highest amounts or winning or losing the most money. The user may then target those players for specific awards/marketing. For example, the user may wish to target a player betting large sums to reward that player for their play, even though they have not accrued sufficient points to be awarded a reward. The user may also target players who have lost large sums of money with awards or rewards in order to entice those players to not stop playing, but instead play for a longer period of time.

In one embodiment, the system of the invention may be used to determine the theoretical win for a gaming machine. As is known, calculation of the theoretical win for a gaming machine, and especially a gaming machine which is adapted to present more than one game, is difficult. Among other things, the theoretical win may depend on the level of play of the different games which may be played on the machine. For example, a first game which may be played using the gaming machine may have one hold percentage, and a second game which may be played using the gaming machine may have a second, different hold percentage. The actual hold percentage is thus likely to be between the first and second hold percentages based on the weighted average play of the two different games.

Illustrated below is a table indicating formulas which may be used to calculate various information related to a player's gaming machine activities:

| Calculation Description | Calculation Formula |
|---|---|
| Slot Machine Theoretical Value | Coin In * Hold % |
| Table Game Theoretical Value | Average Bet * Time Played * (Decisions/Hour) * House Advantage |
| Poker Game Theoretical Value | Average Rake * Games Played Per Hour * Commission Rate * Time Played |
| Slot Machine Actual Win Value | Coin In − Coin Out − Jackpots |
| Table Game Actual Win Value | Buy In - Cash Out |
| Theoretical Comp Margin % | Total Comps and Cash Back Amount/ Total Theoretical Amount |
| Actual Comp Margin % | Total Comps and Cash Back Amount/ Total Actual Amount |
| 'What If' Theoretical Comp Margin % | (Total Comps and Cash Back Amount + 'What If')/Total Theoretical Amount |
| 'What If' Actual Comp Margin % | (Total Comps and Cash Back Amount + 'What If')/Total Actual Amount |

Utilizing these or similar calculations, information can be obtained regarding a player's play. For example, a user of the PTD 86 or slot director 64 of the system 40 illustrated in FIG. 2 may analyze a particular player's play and wish to see the effect of awarding a particular "comp" to that player. These formulations may be implemented at the PTD 86, or at a remote location upon input of required information. In this configuration, however, the user of the PTD 86 may determine that the award of a specific comp is justified. The award may then be delivered to the player of a gaming machine 20 without interruption of the player's game play. For example, the operator of the PTD 86 may print an award voucher or ticket using the attached printer 94 or local printer 98.

As illustrated in FIG. 17, this calculated information may be displayed, such as on the display of the PTD 86 (see FIG. 2). FIG. 17 illustrates one embodiment of a graphical display which includes player information as well as collected and calculated information. As indicated above and illustrated in FIG. 15, such information may be displayed as a result of selecting a particular menu feature such as "what if . . . " in association with a particular select player. It will be appreciated that the selection of such a menu item or otherwise may cause the display of an interface which also permits the user to select various "what if . . . " criteria such as the amount of a comp or the like for use in calculating information in accordance with the above and other formulas.

By obtaining actual game play information, a user can determine the level of play of each of the games offered by a gaming device. The user can also determine, as the games are played, the actual machine hold or payout percentages. Using the combined information, the host can offer the user information regarding the theoretical hold percentage for the machine over a certain period of time. Such information may be useful for a variety of purposes, such as projecting casino revenues and budgets.

Figure 7:
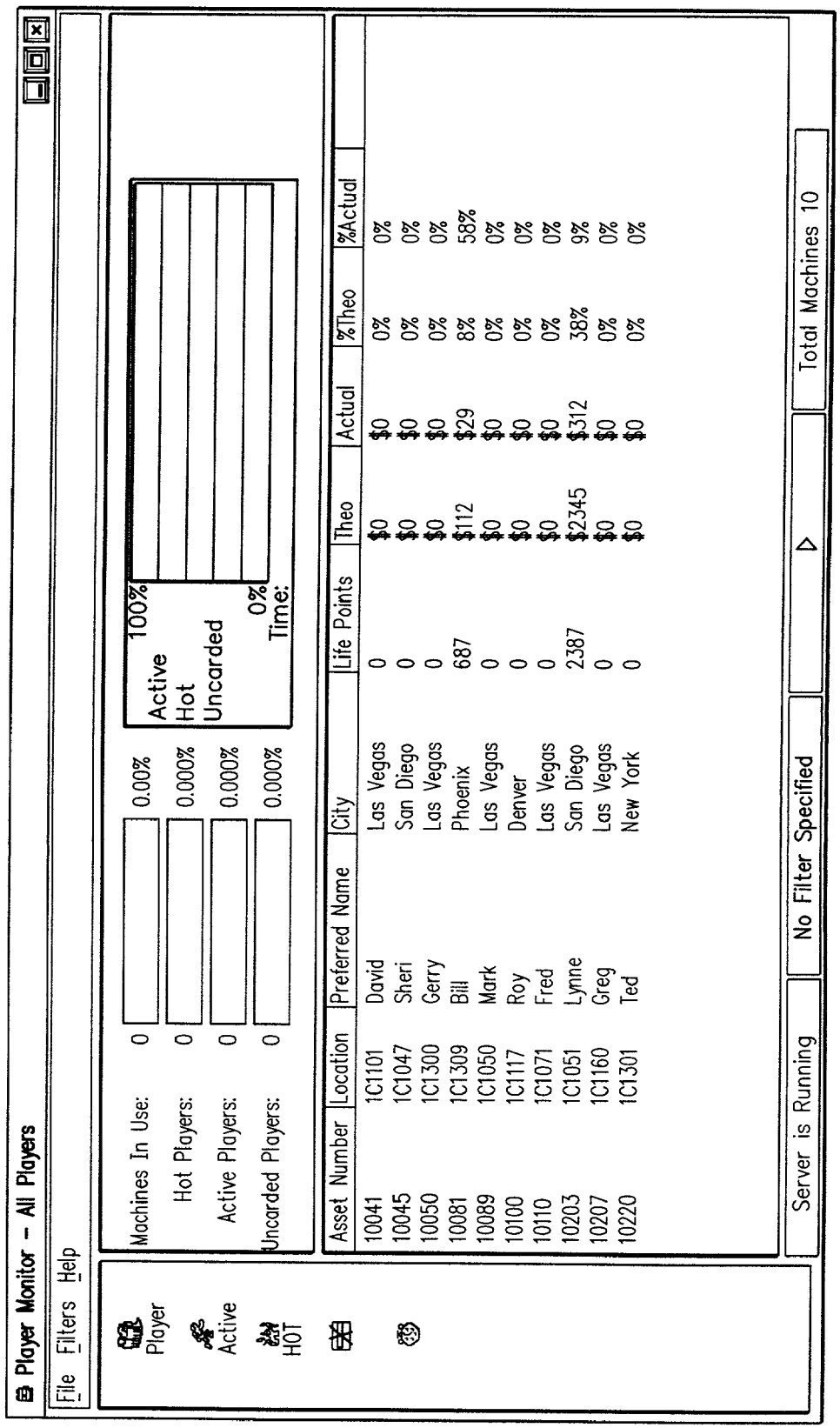
FIG. 7 illustrates the graphical user interface illustrated in FIG. 5 configured to display certain player play results.

Referring to FIGS. 7 and 17, detailed information regarding hold percentages for particular players may be determined and displayed. As illustrated in these figures, the interface may be configured to display information regarding the player's theoretical win (such as potential dollars to be won vs. amounts bet, when considering the odds of the game or event) for prior games played and the player's actual winnings as a result of playing those games. This information is useful in establishing a player's play results and targeting particular players for rewards. As also illustrated, information may be determined regarding the player's theoretical win and actual win if a reward or "comp" is provided to the player, when considering the value of that reward. It will be appreciated that if such an award is provided, then the player's theoretical win amount for playing the game(s) rises, as does the player's actual percentage win.

A wide variety of features may be provided. For example, a help menu may be provided for providing a user with information regarding how to perform certain actions. A user may also be permitted to generate custom reports using filter parameters. A user may be permitted to change aesthetic and functional aspects of the interface and other screens, displays and the like, including such elements as the colors, fonts, sounds and the like. In one embodiment additional useful information such as the time, date and the like associated with the processor of the host may be displayed.

In one or more embodiments, the game play, player and other information described herein may be displayed at a remote location or exported to the location. Referring to FIG. 2, in one embodiment, the game play monitoring system host 44 may be adapted to generate the interface 80 and display it on one or more of the remote stations 64,66,68 and/or the PTD 86, such as in response to a particular input at one or more of those stations. Particular information may then be generated by the host 44 and then forwarded to the station 64,66,68 and/or PTD 86 for display. In another embodiment, the collected game play information may be exported to such a remote station or other system/device. For example, collected game play information over a period of time may be stored at the host 44, and then transmitted to a remote station for use, including display. The information may be transmitted to a wireless or hand-held device, such as the PTD 86 of the system 40 illustrated in FIG. 2 as utilized by a mobile user, such as while on the casino floor.

The ability to store and then export the collected game play data permits the system 44 to be used as a back-up to other systems. For example, if the gaming machine host 72 were to fail and lose information regarding recent gaming machine meter events, then the data may be retrieved from the game play monitoring system host 44 and exported to the gaming machine host 72.

In accordance with the invention, a system is provided by which game play of a plurality of gaming machines or devices or events, whether associated with different systems or located remote from one another, may be monitored. The real-time game play information may be stored, manipulated, displayed, or used in a variety of manners to the advantage of the operator of the gaming machines or other devices.

Using hand-held and/or remote devices or stations, casino personnel may be provided with real-time game play information which allows them to make real-time adjustments to casino operations. A casino personnel with a hand-held, portable device (such as a PTD 86) may roam the casino floor and at the same time be provided real-time game play information. Such personnel may identify, for example, that a certain bank of machines are being heavily used while another bank of machines is not. Traveling to those machines, the personnel may identify that a hostess is providing free drinks to the patrons of the first bank of machines, while the other bank of machines is unattended. The personnel may then make an immediate adjustment to address the lack of service at the second bank of machines.

Casino personnel may also determine, for example, that a particular player of a table game is placing very large bets. The casino can then monitor the player and, if desired, reward the player for their risk-taking and potential profitability to the casino.

As one aspect of the invention, notification may be provided to personnel, such as those using the PTD 86 illustrated in FIG. 2, when a particular player begins playing a gaming machine 20 or reaches a specific play level. For example, when a particular player begins playing, a notification may be transmitted from the host 44 to each PTD 86 or the one or more users of PTDs 86 located closest to the player so that they may travel to the player and greet the player, provide them with information regarding the latest promotions and the like. Notifications may also be provided regarding non-gaming events. For example, a notification may be provided regarding the player checking into an associated hotel, the player checking out, reservation confirmation and other events. For example, upon notification that a particular player has checked into the hotel, the operator of the PTD 86 may elect to provide a promotional award to the player, such an award if the player plays at a later time a specific game or gaming machine in the casino. For example, when a player checks out, the user of the PTD 86 may review the player's information and determine that it would be beneficial to send the player a promotional award to entice the player to come back and play again at a later date.

The notification regarding the non-gaming event may be input via a wide variety of devices, such as a reservation system which is linked to the host 44. The host 44 may then forward the information to the PTD 86. Notification of a promotion or the like may then be provided to the player in a variety of ways. For example, the promotional information input through the PTD 86 may be transmitted back through the host 44 to the reservation system and given directly to the player at check-in, or delivered in printed form to their room, or indicated to the player when the player begins play of a game.

One aspect of the invention is that by using the system, the casino or other game operator can immediately identify and reward a player. As noted, in the prior art a player must generally travel to a remote customer service area to check their accrued points to determine if they are entitled to a reward. Alternatively, the casino may send reward notices to players in the mail or the like.

As one aspect of the invention, the system permits real-time communication with one or more players. For example, instead of physically contacting a player, information may be sent to the gaming machine which the player is playing. If a player achieves a level of play and the casino wishes to reward the player, a message, such as an audio or video message, may be sent to the player via the system indicating to the player that the award has been received. Other messages and information may be provided to players. For example, a message may be sent to each gaming machine which is being played by an unidentified (i.e. uncarded) player inviting them to sign up for the rewards program. Thus, the system may be used as a communication channel, and the game play data which is monitored may be used as criteria for generating certain communications.

FIG. 18 illustrates one embodiment of an interface or screen which may be displayed to a user of a device, such as the PTD 86 of the system 40 illustrated in FIG. 2. This interface may be displayed as a result of the user of the device making a specific menu selection. The interface permits the user to send a message to a player of a gaming machine. In accordance with this aspect of the invention, the user may input a message and direct it, such as through the system 40 of FIG. 2, to a particular player of a gaming machine. The message may be of a variety of types, including general information, detail the award of a bonus or the like.

In accordance with the invention, the casino can identify players which are to be rewarded based on their present or current play. In addition, once such a player is identified, it is possible to know where that player is and have casino personnel travel to them and personally and immediately provide them a reward. For example, a particular player of a table game betting large amounts may be identified. The user of the system 40 may also identify the particular table at which that player is playing, and then contact a floor person to travel to them and provide the player with a reward.

In one or more embodiments, the host may be programmed to scan current game play data to identify particular players to be rewarded. For example, a user of the system 40 illustrated in FIG. 2 may program specific filtering criteria which is scanned against the received game play data. Such criteria may comprise a certain length of time for a single player, total coin or credits in, credits or coins won, a number of player points rewarded in a particular session, a number of games played or the like. In the event such criteria are met by the current play of a device or event by a player, then an indication of such may be provided to the user. The indication may be an audible or visible alarm, such as the direct presentation of information regarding the player's identity and game play information which met the criteria.

In one embodiment, awards are associated with "promotions." The promotion may require a number of criteria, such as those described above, be met in order for a player to be entitled to an award. The promotion may have a time period during which the promotion is active and available for winning to a player. In one embodiment, a player can only win a promotion by actively playing a gaming machine or engaging in another qualifying event (such as table game play) during the promotional period of time. Verification of the player's eligibility may be determined by confirming the active status of the player based on their player card usage.

A player who meets the required promotion requirements (such as, for example, using their player tracking card and playing a minimum number of games before the expiration of the promotional time period) may be entitled to an award. In one embodiment, as described above in conjunction with FIG. 2, game play information is preferably transmitted from the gaming machine 20 or other device to the host 44. In one embodiment, game play information is tracked at the machine 20 and the game play information is aggregated and periodically forwarded to the host 44.

In the event the player does not meet the requirements for being awarded an award, the game play information is preferably still forwarded to the host 44. In this manner, the game operator may determine a variety of information, such as how close a player is to winning an award and the like. This information may be printed in the form of a report for viewing, or be displayed.

In the event the player is awarded a "comp" or bonus, the award may take several forms. In one embodiment, the award may be represented by a printed ticket or voucher. This printed ticket or voucher may be printed by a user of the PTD 86, such as by using the printer 94 attached thereto or by printing the voucher or ticket at a nearby printer 98. In another embodiment, information regarding the award may be displayed to the player at the gaming machine, such as on a display or the like. For example, in like manner to that referred to above with respect to FIG. 18 by which a message may be transmitted from a remote device (such as PTD 86) to the player, a bonus or award message may be transmitted. If the gaming machine 20 includes a printing device, a ticket or receipt evidencing the award may also be provided directly at the gaming machine 20.

Awards such as bonuses or "comps" may be awarded based on a variety of criteria. As indicated, in one embodiment a player may be required to meet a number of conditions or criteria. In one embodiment, awards may be randomly assigned to players of gaming machines or other games who are using their player tracking cards. In another embodiment, the awards may be provided only when a player meets other criteria, such as specific game play. In one embodiment, an award may be provided to a player solely at the discretion of gaming personnel. For example, a user of a hand-held device observing a particular player may determine that the player should be awarded a comp. The user may view the player's play data using the hand-held device and observe that the player has suffered a number of successive losses, and while the player would not otherwise meet other criteria for being awarded a bonus or comp such as having bet a sufficient amount of money over a period of time, the user may award the player an award to dissuade them from stopping play. As also indicated above, the user of the PTD 86 may observe that certain gaming machines are not being played and may issue awards to players who begin play of those machines.

Various awards or "comps" may be provided. These awards may comprise free game play and prizes including goods and services, discounts, and money. For example, awards of lesser value may be awarded more frequently than those of a higher value. In one embodiment, a player may be entitled to multiple awards so long as the player meets the requisite criteria.

In one embodiment, the award may simply be a real or virtual "ticket" which entitles a player to participate in an opportunity to win an award. For example, if a specific player meets the required criteria, the player may be awarded a real or virtual ticket. This ticket may be utilized in a random drawing or selection of multiple tickets, with the winner of actual prizes being the one or more players whose tickets were selected. Thus, for example, a player may play a gaming machine 20 for a long period of time in an attempt to earn or be awarded several tickets which may be used in such a drawing to improve their chances of winning the drawing.

In one embodiment, the winner of such an event, such as a drawing, may be displayed to the operator of the PTD 86 or other device, such as the slot director 64. FIG. 19 illustrates graphical display of such information.

Figure 20:
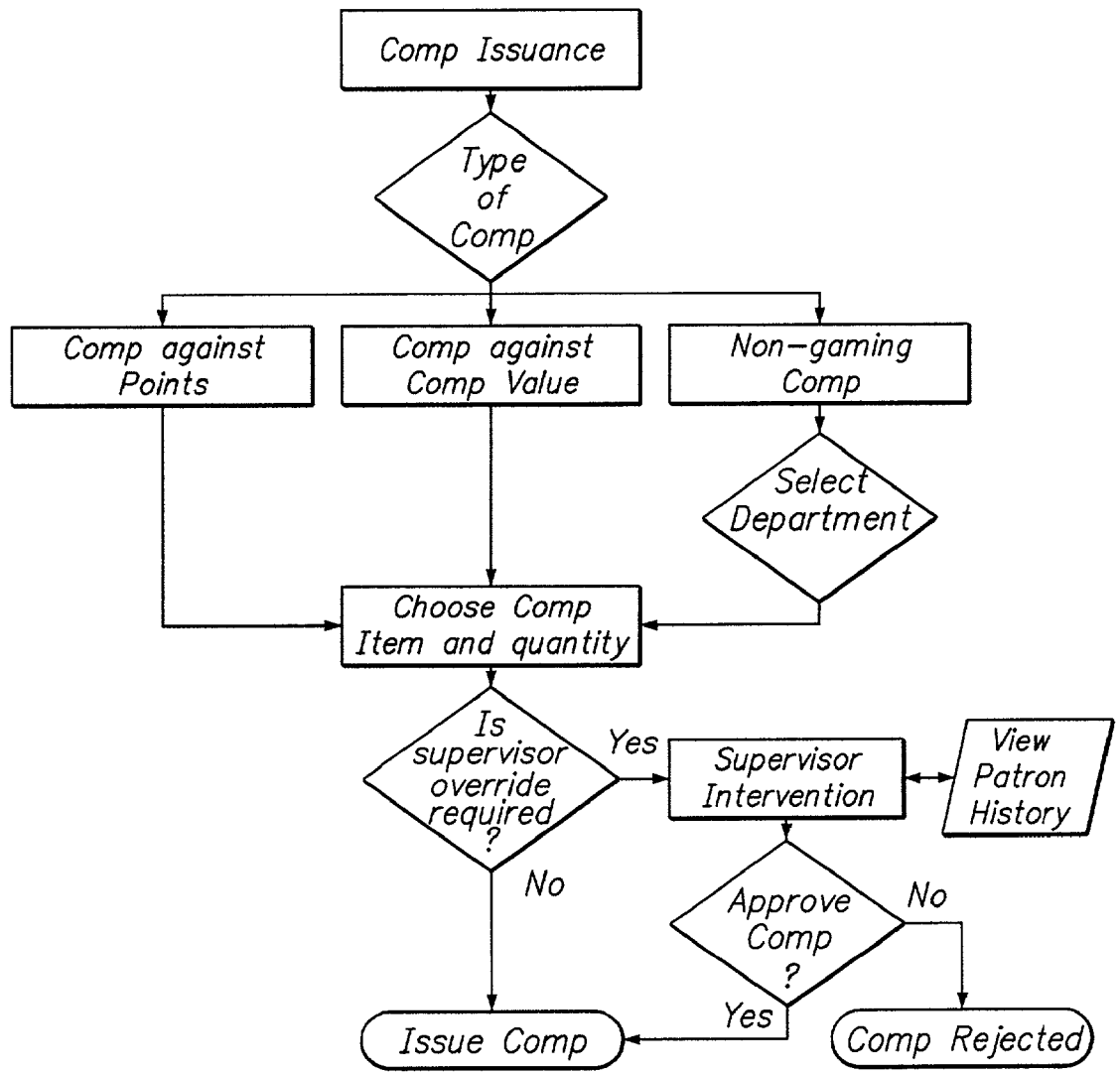
FIG. 20 is a flow diagram illustrating a method of issuing a "comp" in accordance with an embodiment of the invention.

As one aspect of the invention there is a method of issuing a "comp" or similar award. One embodiment of a method is illustrated in FIG. 20. One embodiment of the method may be implemented using the PTD 86 or station 64,66,68 of the system 40 illustrated in FIG. 2. In one embodiment, the method may be implemented through the use of interfaces, menus and windows in like manner to various of the features and functions described above.

In one embodiment of a method, a first step comprises selecting a particular type of comp or award to issue. The comp or award may be of a variety of types. In one embodiment, these types include comps awarded against points accrued by or assigned to a particular player, comps awarded against comp value, and comps which are not associated with gaming activities. As is known in the art of player tracking systems, players may be awarded points for engaging in certain activities associated with the play of games and gaming machines. For example, a player may be awarded points based upon amounts bet while playing a gaming machine. A player may be awarded a comp based upon the awarded points. A comp may similarly be awarded against value.

A comp may also be awarded which is not based upon a players gaming play, as evidenced by points or value. For example, a hotel associated with a casino may desire to issue discount lodging comps to players of the casino to entice them to stay in the hotel. In one embodiment of the invention, the method includes the step of assigning such a comp to a particular entity or source, such as a particular department of a company.

In one embodiment of the method, besides selecting a particular type of comp, the method includes the step of selecting a particular comp item and the quantity or value thereof. For example, a list of available comp awards may be provided including a variety of goods, discounts, and credits. Besides selecting a particular comp, the value (such as size of the credit) or quantity (such as number of goods) awarded is designated.

The method may include a variety of other steps depending on the particular implementation. For example, depending upon the particular comp which is selected, a supervisor override may be required. In one embodiment selected comps may trigger a flag causing a window to be displayed requesting supervisor approval, for example. The user of the device, such as the PTD 86, may then be required to seek a supervisor and have the supervisor enter an approval code or the like to override the flag and allow the comp to be issue.

Other steps of the method may including printing or reprinting a comp. This step may comprise a user of the device, such as the PTD 86, once a comp has been approved to select a "print" menu item. The printing step may comprise printing a physical ticket or voucher, as described above. In one embodiment, the method may also comprise the step of reprinting a voucher or ticket for a comp.

Other steps of the method may include voiding an issued comp. In one embodiment, once a comp has been selected and if necessary, approved, the comp is issued. As described above, once issued a comp may be printed and provided to a player. In one embodiment, an issued comp may be voided. A variety of reasons may exist for voiding a comp, and this step permits the comp to be entirely voided.

In one embodiment, when a comp is issued, a player's account data may be updated. For example, if a comp is awarded against a player's accrued points, the total number of points may be reduced by a number of points associated with the awarded comp. Of course, in one or more embodiments, a comp may be awarded without an associated reduction in the player's points. Likewise, if an adjustment to the player's account has been made when a comp is issued, if that comp is later voided, the player's account is preferably updated once again to reflect this fact.

As indicated above, the systems and methods of the invention have a number of advantages over the prior art. In accordance with the invention, up-to-date player information may be provided to gaming and other personnel, including remotely located personnel and personnel who are mobile. The information may be used for a variety of purposes, including to implement a wide variety of business strategies, such as increasing the level of play at under-played gaming machines and to entice specific player play. The systems and methods provide for direct location of players, direct communication with players, and the providing of awards or "comps."

In one embodiment of the invention, player and game play information is presented in a concise and easy to use manner. As indicated, symbols, including colored symbols, may be used to indicate the status of players or game play levels. These symbols greatly reduce the amount of analysis which casino personnel must engage in to determine game play activity. For example, colored symbols may be used to immediately identify game play levels of a number of players.

The systems and methods provide for the display of a wide variety of information including current and historical game play and player information. Theoretical or "what if" information may also be generated for use in making business decisions.

Advantageously, in one embodiment of a system, game play and player information may be provided to mobile personnel, such as those using hand-held wireless devices. These devices may also be configured to permit the personnel to issue awards at the location of a particular player, eliminating the need for a player to travel to a remote location to redeem an award. This system reduces lost playing time caused by player travel, increasing game play revenues.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A method for remote monitoring and local reward of game play on a plurality of gaming devices by a portable handheld monitoring device, each gaming device configured to present a game of chance and adapted to receive a wager from a player located at the gaming device and, responsive to play of the game of chance, output a game play award, the method comprising:

receiving game play information, including player information and gaming device information, at the portable handheld monitoring device, the player information including game play history of the player located at the gaming device, and the gaming device information including wager and payout information associated with the gaming device at which the player is located;

generating a graphical representation of the received game play information;

displaying the graphical representation of the received game play information on a display of the portable handheld monitoring device;

applying one or more criteria to the received game play information;

determining a physical location of the gaming device at which the player is located;

determining, based on the application of the one or more criteria to the received game play information, including the player information and the gaming device information, at the portable handheld monitoring device, an award amount for the player located at the gaming device when the portable handheld monitoring device is in a physical location close to the location of the gaming device; and outputting the award amount from an output of the portable handheld monitoring device for delivery to the player at the gaming device.

2. The method of claim 1, wherein the game play information includes one or more selected from the group consisting of player identification information, gaming machine identification information, wager information, payout information, length of time of game play, game results, type of game, game play history, and player account information.

3. The method of claim 2, wherein the wager information includes relative wager information.

4. The method of claim 1, wherein determining the award amount for the player includes:

determining a theoretical win amount for the player, the theoretical win amount as a measure of a prediction of future winnings by the player; and determining the award amount for the player according to the determined theoretical win amount.

5. The method of claim 1, wherein determining the award amount for the player includes:

determining an actual win amount for the player; and determining the award amount for the player according to the determined actual win amount.

6. The method of claim 1, wherein determining the award amount for the player includes:

determining one or more future game play calculations based on the game play information, the future game play calculations as a measure of a prediction of future game play by the player, the one or more future game play calculations selected from the group consisting of a machine theoretical value, a game theoretical value, and a theoretical comp margin; and determining the award amount for the player according to the determined one or more future game play calculations.

7. The method of claim 1, wherein determining the award amount for the player includes:

determining one or more present game play calculations based on the game play information, the one or more present game play calculations selected from the group consisting of a machine actual win value, a game actual win value, and an actual comp margin; and determining the award amount for the player according to the determined one or more present game play calculations.

8. The method of claim 1, further comprising:

generating status information for the player using the received game play information, the status information determined by comparing the received game play information to predetermined status criteria.

9. The method of claim 8, wherein the predetermined status criteria includes one or more selected from the group consisting of a length of time of game play, an amount wagered, a payout amount, a number of points awarded, and a number of games played.

10. The method of claim 8, wherein determining the award amount for the player includes:

determining the award amount for the player according to the generated status information.

11. The method of claim 8, further comprising:

generating a graphical representation of the status information; and displaying the graphical representation of the status information on the display.

12. The method of claim 8, wherein the status information indicates a level of play for the player.

13. The method of claim 12, wherein the level of play is selected from the group consisting of amounts bet, amounts bet during a time period, number of games played, and a time of play on the gaming device.

14. The method of claim 1, further comprising:

generating a user interface;

displaying the user interface on the display, the graphical representation displayed as a part of the user interface.

15. The method of claim 1, wherein outputting the award amount comprises:

printing the award amount on a ticket.

16. The method of claim 1, wherein outputting the award amount comprises:

printing the award amount on a voucher.

17. The method of claim 1, wherein outputting the award amount comprises:

displaying the award amount on a display.

18. The method of claim 1, wherein the award amount is associated with a promotion.

19. The method of claim 1, wherein the award amount includes one or more selected from the group consisting of a free game play, a product, a service, a discount, money, and a raffle ticket.

20. The method of claim 1, further comprising:

retrieving further game play information from a memory.

21. The method of claim 1, wherein the gaming device is a gaming machine.

22. The method of claim 1, wherein determining the award amount for the player includes:

determining a number of points accrued to the player; and determining the award amount for the player according to the determined number of points.

23. The method of claim 1, wherein the output of the portable handheld monitoring device includes a printer.

24. The method of claim 1, wherein outputting the award amount from the output of the portable handheld monitoring device includes printing an award receipt on the printer.

25. The method of claim 1, wherein the output of the portable handheld monitoring device includes a communications interface.

26. The method of claim 1, wherein the award is provided in response to the player located at the gaming device beginning play of the gaming device after a period of time during which the gaming device is not played.

27. The method of claim 22, wherein the number of points is provided in the game play information.

28. A method for remote monitoring and local reward of game play on a plurality of gaming devices by a portable handheld monitoring device in communication with a remote host over a second communications channel, the remote host in communication with the gaming devices over a first communications channel, each gaming device configured to present a game of chance and adapted to receive a wager from a player located at the gaming device and, responsive to play of the game of chance, output a game play award, the method comprising:

receiving game play information at the remote host over the first communications channel, the game play information including player information and gaming device information,
- the player information including game play history of the player located at the gaming device, and
- the gaming device information including wager and payout information associated with the gaming device at which the player is located;

sending the received game play information from the remote host to the portable handheld monitoring device over the second communications channel;

generating a graphical representation of the received game play information at the portable device, the graphical representation of the received game play information including gaming device information;

displaying the graphical representation of the received game play information on a display at the portable handheld monitoring device;

applying one or more criteria to the received game play information;

determining a physical location of the gaming device at which the player is located;

determining, based on the application of the one or more criteria to the received game play information, including the player information and the gaming device information, at the portable handheld monitoring device, an award amount for the player when the portable handheld monitoring device is in a physical location close to the location of the gaming device; and outputting the award amount from an output of the portable handheld monitoring device for delivery to the player at the gaming device.

29. The method of claim 28, wherein the first communications channel is wireless.

30. The method of claim 28, wherein the second communications channel is wired.

31. A system for remote monitoring and local reward of game comprising:
- a plurality of gaming devices each configured to present a game of chance and adapted to receive a wager from a player located at the gaming device and, responsive to play of the game of chance, output a game play award;
- a remote host in communication with the gaming devices over a first communications channel, the remote host configured to:
  - i) receive game play information over the first communications channel, and
  - ii) send the received game play information, the received game play information including player information and gaming device information,
    - the player information including game play history of the player located at the gaming device, and
    - the gaming device information including wager and payout information associated with the gaming device at which the player is located; and
- a portable handheld monitoring device in communication with the remote host over a second communications channel, the portable handheld monitoring device configured to:
  - i) receive the game play information from the remote host over the second communications channel,
  - ii) generate a graphical representation of the received game play information including gaming device information,
  - iii) display the graphical representation of the received game play information on a display of the portable handheld monitoring device,
  - iv) apply one or more criteria to the received game play information, including the player information and the game device information,
  - v) determine the location of the gaming device at which the player is located, and
  - vi) determine, based on the application of the one or more criteria to the received game play information, including the player information and the gaming device information, an award amount for the player when the portable handheld monitoring device is in a physical location close to the location of the gaming device, and
  - vii) output the award amount from an output of the portable handheld monitoring device for delivery to the player at the gaming device.

32. A computer program product, stored on a processor readable medium, comprising instructions operable to cause a processor to perform a method for remote monitoring and local reward of game play on a plurality of gaming devices by a portable handheld monitoring device, each gaming device configured to present a game of chance and adapted to receive a wager from a player located at the gaming device and, responsive to play of the game of chance, output a game play award, the method comprising:
- receiving game play information including player information and gaming device information at the portable handheld monitoring device,
  - the player information including game play history of the player located at the gaming device, and
  - the gaming device information including wager and payout information associated with the gaming device at which the player is located;
- generating a graphical representation of the received game play information;
- displaying the graphical representation of the received game play information on a display of the portable handheld monitoring device;
- applying one or more criteria to the received game play information;
- determining a physical location of the gaming device at which the player is located;
- determining, based on the application of the one or more criteria to the received game play information, including the player information and the gaming device information, at the portable handheld monitoring device, an award amount for the player when the portable handheld monitoring device is in a physical location close to the location of the gaming device; and
- outputting the award amount from an output of the portable handheld monitoring device for delivery to the player at the gaming device.

33. A method for remote monitoring of game play and local reward at one of a plurality of gaming devices using a portable handheld monitoring device, each gaming device configured to present a game of chance, receive a wager for play of the game of chance, and output an award for a winning outcome of the game of chance, the method comprising:
- receiving game play information at the portable handheld monitoring device over a communications path of a network, the received game play information including player information, the player information including game play history of a player located at a gaming device;
- generating game monitoring data based on the received game play information, the game monitoring data including gaming device information, the gaming device information including wager and payout information associated with the gaming device at which the player is located;

displaying the player information and the game monitoring data on a display of the portable handheld monitoring device;

applying one or more criteria to the received game play information;

identifying, from the game play information, a location of the player at the gaming device;

determining, based on the application of the one or more criteria to the received game play information, including the player information and the game monitoring data, a reward for a player when the portable handheld monitoring device is in a physical location close to the identified location of the gaming device, the reward independent of an award for a winning outcome of a game of chance; and causing output of the reward from an output device associated with the portable handheld monitoring device for delivery to the player at the identified location.

34. The method of claim 33, wherein the generated game monitoring data includes the received game play information.

35. The method of claim 33, wherein the game play information includes one or more selected from the group consisting of player data, gaming machine data, and game play data.

36. The method of claim 33, wherein the game monitoring data includes one or more selected from the group consisting of: a number of gaming devices in use, a number of gaming devices in play, one or more types of gaming machines in use, a number of players of gaming machines, and a number of identified players.

37. The method of claim 33, wherein the gaming devices include one or more selected from the group consisting of a gaming machine, a table game device, a bingo device, a keno device, and a sports betting device.

38. The method of claim 33, wherein the game play information is received responsive to occurrence of a game event.

39. The method of claim 33, wherein generating game monitoring data based on the received game play information includes:

comparing the received game play information to one or more criteria.

40. The method of claim 39, wherein the output device is one selected from the group consisting of an electronic communications interface, a printer of the portable handheld monitoring device, and a local printer.

41. The method of claim 33, wherein the portable handheld monitoring device is a portable transaction device (PTD).

42. The method of claim 33, wherein the game play information is received from the one or more gaming devices.

43. The method of claim 33, wherein the game play information is received from a host device.

44. The method of claim 39, wherein generating game monitoring data based on the received game play information further includes:

determining a status of the player relative to the one or more criteria.

45. A method for remote monitoring of game play and local reward at one of a plurality of gaming devices using one or more monitoring devices including a portable handheld monitoring device, each gaming device configured to present a game of chance, receive a wager for play of the game of chance, and output an award for a winning outcome of the game of chance, the method comprising:

receiving game play information over a communications path of a network, the received game play information including player information, the player information including game play history of a player located at a gaming device;

generating game monitoring data based on the received game play information, the game monitoring data including gaming device information, the gaming device information including wager and payout information associated with the gaming device at which the player is located;

displaying the player information and the game monitoring data on a display;

applying one or more criteria to the received game play information;

identifying, from the game play information, a location of the player at the gaming device;

determining, based on the application of the one or more criteria to the received game play information, including the player information and the game monitoring data, a reward for a player when the portable handheld monitoring device is in a physical location close to the identified location of the gaming device, the reward independent of an award for a winning outcome of a game of chance; and causing output of the reward, at the portable handheld monitoring device, for delivery to the player at the identified location.

46. A method for remote monitoring and local reward of game play on a plurality of gaming devices by a portable handheld monitoring device, each gaming device configured to present a game of chance and adapted to receive a wager from a player located at the gaming device and, responsive to play of the game of chance, output a game play award, the method comprising:

receiving game play information at the portable handheld monitoring device via a communications channel, the game play information including player information describing the player and gaming device information describing at least one gaming device;

displaying the player information, including game play history of the player, on the display of the portable handheld monitoring device;

displaying the gaming device information, including wager and payout information of the gaming device at which the player is located, on the display of the portable handheld monitoring device;

receiving an award selection from the user of the portable handheld monitoring device when the portable handheld monitoring device is in a physical location close to the gaming device; and causing an award to be provided to the player in accordance with the award selection when the award selection indicates than an award is to be provided.

47. The method of claim 46, further comprising:

receiving at the portable handheld monitoring device one or more player characteristics, wherein the player comprises a player having the one or more player characteristics.

48. The method of claim 46, wherein identifying a gaming device comprises:

displaying at least one gaming device identifier from the gaming device information on a display of the portable handheld monitoring device, wherein the at least one gaming device identifier identifies at least one gaming device located in a physical location close to the handheld monitoring device; and receiving selection of the gaming device from the at least one gaming device identifier via the portable handheld monitoring device.

49. The method of claim 46, wherein identifying a player comprises:

displaying at least one player name on a display of the portable handheld monitoring device, wherein the at least one player name corresponds to a player playing a game of chance on the gaming device; and receiving selection of the player from the at least one player name via the portable handheld monitoring device.

50. The method of claim 46, wherein selecting a player comprises selecting a player betting, winning, or losing a sum of money greater than a predetermined threshold.

51. A system for remote monitoring and local reward of game play, the system comprising:

at least one gaming device configured to present a game of chance and adapted to receive a wager from a player located at the at least one gaming device and, responsive to play of the game of chance, output a game play award;

at least one portable handheld monitoring device;

a remote host in communication with the at least one gaming device over a first communications channel, the remote host configured to:

receive game play information over the first communications channel, the game play information including player information describing the player and gaming device information describing a gaming device, wherein the gaming device is from the at least one gaming device, in response to receiving the game play information, determine when the player begins playing at the gaming device or when the player reaches a predetermined level of play, generate a notification when the player begins playing at the gaming device or when the player reaches a predetermined level of play, identify a closest portable handheld monitoring device from the at least one portable handheld monitoring device, wherein the closest portable handheld monitoring device is a portable handheld monitoring device closest to the gaming device at which the player is playing, and send the notification and the game play information to the closest portable handheld monitoring device;

the closest portable handheld monitoring device in communication with the remote host over a second communications channel and configured to:

receive the notification and game play information from the remote host over the second communications channel, display a graphical representation of the notification and game play information on a display of the closest portable handheld monitoring device, determine, based on the received notification and the received game play information, including the player information and the gaming device information, an award amount for the player, and output the award amount from an output of the closest portable handheld monitoring device for immediate delivery to the player at the gaming device.

\* \* \* \* \*